United States Patent
Zaghib et al.

(10) Patent No.: US 8,114,469 B2
(45) Date of Patent: Feb. 14, 2012

(54) LI4TI5O12, LI(4-α)ZαTI5O12 OR LI4ZβTI(5-β)O12 PARTICLES, PROCESSES FOR OBTAINING SAME AND USE AS ELECTROCHEMICAL GENERATORS

(75) Inventors: Karim Zaghib, Longueuil (CA); Michel Gauthier, La Prairie (CA); Fernand Brochu, Longueuil (CA); Abdelbast Guerfi, Brossard (CA); Monique Masse, Longueuil (CA); Michel Armand, Montreal (CA)

(73) Assignee: Hydro-Quebec, Montreal, Quebec (CA)

( * ) Notice: Subject to any disclaimer, the term of this patent is extended or adjusted under 35 U.S.C. 154(b) by 0 days.

(21) Appl. No.: 12/149,535

(22) Filed: May 2, 2008

(65) Prior Publication Data
US 2008/0285211 A1   Nov. 20, 2008

Related U.S. Application Data

(60) Division of application No. 10/830,240, filed on Apr. 23, 2004, now abandoned, which is a continuation of application No. 10/432,999, filed as application No. PCT/CA01/01714 on Dec. 3, 2001, now abandoned.

(30) Foreign Application Priority Data

Dec. 5, 2000  (CA) .................................. 2327370

(51) Int. Cl.
*B05D 5/12*   (2006.01)
(52) U.S. Cl. ........ 427/122; 427/212; 427/215; 427/226; 427/372.2; 427/384
(58) Field of Classification Search ............. 427/212, 427/215, 226, 372.2, 384, 122
See application file for complete search history.

(56) References Cited

U.S. PATENT DOCUMENTS

| | | | |
|---|---|---|---|
| 5,415,878 | A | 5/1995 | Newton et al. |
| 5,591,546 | A | 1/1997 | Nagaura |
| 6,083,644 | A | 7/2000 | Watanabe et al. |
| 6,103,422 | A | 8/2000 | Kanai |

(Continued)

FOREIGN PATENT DOCUMENTS

EP  0 617 474  9/1994

(Continued)

OTHER PUBLICATIONS

Office Action cited in Japanese Appln No. 2002-547845 & English language translation thereof.

(Continued)

*Primary Examiner* — Elena T Lightfoot
(74) *Attorney, Agent, or Firm* — Buchanan Ingersoll & Rooney PC

(57) ABSTRACT

A process for synthesizing particles of an oxide corresponding to a formula selected from: $Li_4Ti_5O_{12}$; $Li_{(4-\alpha)}Z_\beta Ti_5O_{12}$; and $Li_4Z_\alpha Ti_{(5-\beta)}O_{12}$, said process including the steps of: a) preparing an intimately dispersed ternary mixture of $TiO_x$—$Li_zY$-carbon, wherein x is a number between 1 and 2, z is 1 or 2, Y is a radical chosen from the group consisting of $CO_3$, OH, O and $TiO_3$ or a mixture thereof, and the carbon is a carbon powder selected from the group consisting of natural or artificial graphite, carbon black, Shawinigan black, Ketjen black and cokes; b) heating the dispersion at a temperature of between 400 and 1,000° C.; and c) if appropriate, adding a source of at least one metal Z to the ternary mixture, wherein the operating conditions are chosen in such a way as to yield a conversion of the initial products respectively into $Li_4Ti_5O_{12}$, $Li_{(4-\alpha)}Z_\alpha Ti_5O_{12}$, $Li_4Z_\beta Ti_{(5-\beta)}O_{12}$.

32 Claims, 16 Drawing Sheets

U.S. PATENT DOCUMENTS

Figure 1:
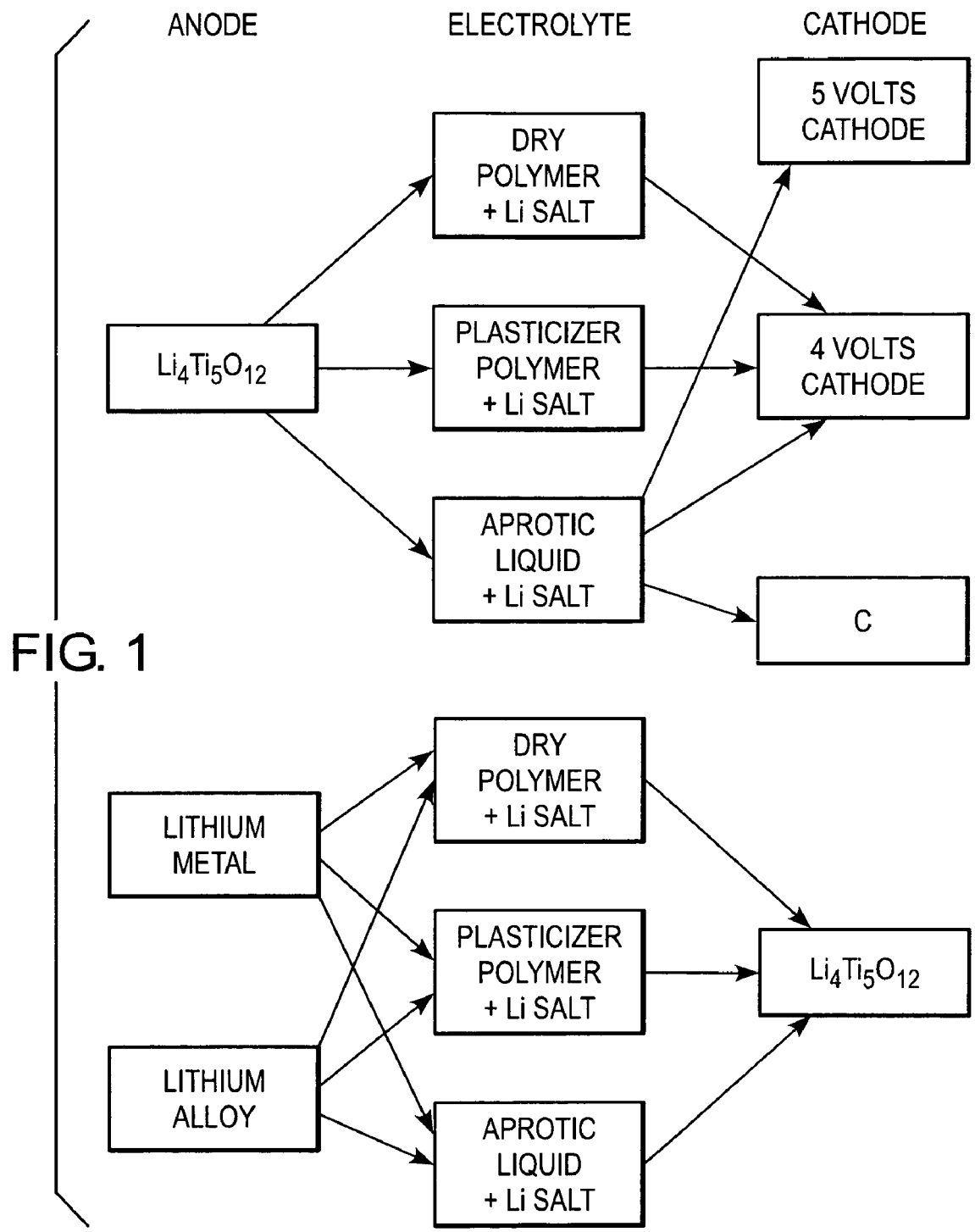

| | | |
|---|---|---|
| 6,221,531 B1 | 4/2001 | Vaughey et al. |
| 6,749,648 B1 | 6/2004 | Kumar et al. |
| 6,855,273 B2 | 2/2005 | Ravet et al. |
| 2001/0031401 A1 | 10/2001 | Yamawaki et al. |
| 2001/0041293 A1 | 11/2001 | Barsukov et al. |

FOREIGN PATENT DOCUMENTS

| | | |
|---|---|---|
| EP | 0 617 474 A1 | 9/1994 |
| EP | 1 081 777 A2 | 3/2001 |
| JP | 51-080317 | 7/1976 |
| JP | 53 149194 | 12/1978 |
| JP | 59-26928 | 2/1984 |
| JP | 06-275263 | 9/1994 |
| JP | 09-309427 | 2/1997 |
| JP | 10-64592 | 3/1998 |
| JP | 10-251020 | 9/1998 |
| JP | 10-334917 | 12/1998 |
| JP | 2000-302547 | 10/2000 |
| JP | 2001-243950 | 9/2001 |
| JP | 2003-272630 | 9/2003 |
| SU | 826 469 | 4/1981 |
| WO | WO 98/05083 | 2/1998 |
| WO | WO 00/60679 | 10/2000 |
| WO | WO 00/63929 | 10/2000 |

OTHER PUBLICATIONS

Nagaura and Tozawa, "Lithium Ion Rechargeable Battery," *Prog. in Batteries & Solar Cells*, 9 (1990), 209-217.

Ohzuku, T. et al., Formation of Lithium-Graphite Intercalation Compounds in Nonaqueous Electrolytes and Their Application as a Negative Electrode for Lithium Ion (Shuttlecock) Cell, *J. Electrochem. Soc.* 140 (1993), 2490-2498.

Zaghib, K. et al., "Solid State Lithium Ion Batteries Using Carbon or Oxide as Negative Electrode," 190th Electrochemical Society Meeting, San Antonio, Abs. No. 93 (1996), 1-2.

Zaghib, K. et al., "Solid State Lithium Ion Batteries Using Carbon or Oxide as Negative Electrode," *Electrochemical Society Proceedings Series*, PV 96-17 (1996), 250-264.

Zaghib, K. et al., "Electrochemistry of Anodes in Solid-State Li-ion Polymer Batteries," *J. Electrochem. Soc.* 145 (1998(, 3135-3140.

Zaghib, K. et al., "Electrochemical Study of $Li_4Ti_5O_{12}$ as Negative Electrode for Li-ion Polymer Rechargeable Batteries," *J. Power Sources*, 81-802 (1999) 300-305.

Schoonman, J. et al., The 198th Meeting of the Electrochemical Society Phoenix, Extend Abstract No. 91, 92 and 98 (Oct. 2000).

Zhu, Qingshan, et al., "Oxidation Resistant SiC Coating for Graphite Materials," *Carbon*, 1999, 1475-1484, vol. 37, No. 9, Pergamon/Elsevier Science Ltd., New York, NY, US (XP004172354, ISSN: 0008-6223).

Gajiwala, H.M. et al., "Hybridized Resin Matrix Approach Applied for Development of Carbon/Carbon Composites—I," *Carbon*, 1998, 903-912, vol. 36, No. 7-8, Pergamon/Elsevier Science Ltd., New York, NY, US (XP00412415, ISSN: 0008-6223).

Stein, Dr., Jurgen, et al., "Mechanofusion for High Performance Particles," *Process Engineering*, Jan. 2002, pp. E-11-E15, vol. 79, No. 4, http://www.alpineag.com/downloads/powder/product/mechanofusion.pdf.

International Preliminary Examination Report issued Feb. 17, 2006 in a corresponding EP application.

International Preliminary Examination Report issued Oct. 6, 2006 in a corresponding EP application.

FIG_3

ADVANTAGE OF MIXTURE

PRETREATMENT AT HIGH ENERGY $$LiOH + C + TiO_2$$

or $$Li_2CO_3 + C + TiO_2$$

or $$LiOH + C + TiO_2 + Li_2CO_3$$

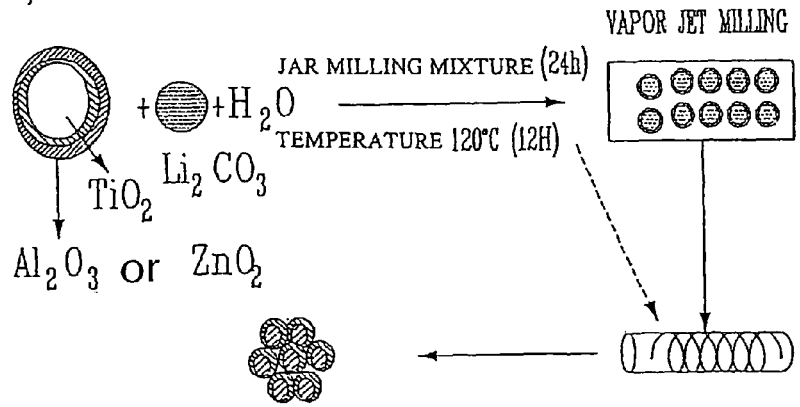
FIG_18

LI4TI5O12, LI(4-α)ZαTI5O12 OR LI4ZβTI(5-β)O12 PARTICLES, PROCESSES FOR OBTAINING SAME AND USE AS ELECTROCHEMICAL GENERATORS

CROSS-REFERENCE TO RELATED APPLICATIONS

This application is a divisional of U.S. application Ser. No. 10/830,240, filed Apr. 23, 2004, which is a continuation of U.S. application Ser. No. 10/432,999, filed May 29, 2003, which is a §371 national stage application of International Application No. PCT/CA01/01714, filed Dec. 3, 2001, and claims priority to Canadian Application No. 2,327,370, filed Dec. 5, 2000, each of which are hereby incorporated by reference in their entirety.

FIELD OF THE INVENTION

The present invention relates to new particles based on $Li_4Ti_5O_{12}$, based on $Li_{(4-\alpha)}Z_\alpha Ti_5O_{12}$, or based on $Li_4Z_\beta Ti_{(5-\beta)}O_{12}$.

The present invention also relates to processes that make it possible to prepare these particles and to their use, especially in the area of electrochemical devices such as electrochemical generators.

DESCRIPTION OF PRIOR ART

Marketing of the lithium-ion battery by Sony, in 1990, was reported by Naguara and Tozawa, Prog. Batt. Solar Cells, 9 (1990), 209. It made possible an expansion and a significant breakthrough of batteries into the area of portable devices (telephone, computer). The technology of Li-ion batteries is based on lithium intercalation electrodes, in particular the anode which is made of graphite. At the time of the first charge, a passivation film is formed on the carbon surface. The chemistry and the composition of this passivation film are complex. The electrochemical formation protocol for this film remains an industrial secret. In addition, at the time of insertion of lithium in carbon, there is a volume variation of 10%, which induces a discontinuity between the particles causing loosening of the interfaces between the electrode and the electrolyte, and between the electrode and the current collector.

Once intercalated ($LiC_6$), the potential of the carbon gets closer to the one of the lithium deposit, which makes the electrode more reactive. The projection of the small battery to a higher scale for hybrid and electric vehicle applications requires a large quantity of electrolytes which makes the safety aspect much more significant.

Titanium oxide spinel $Li_4Ti_5O_{12}$ is a material for anodes promising for lithium-ion batteries due to its intercalation potential (K. Zaghib et al., 190th Electrochemical Society Meeting, San Antonio, Abs. no. 93, 1996), cyclability, rapid charging-discharging at high current such as described by K. Zaghib et al. in Proceeding on Lithium Polymer Batteries, PV96-17, p. 223) in The Electrochemical Society Proceeding Series (1996), (K. Zaghib et al., J. Electro chem. Soc. 145, 3135, (1998) and in J. Power Sources, 81-82 (1999) 300-305). The coefficient of diffusion of lithium in $Li_4T_5O_{12}$ is of a higher order of magnitude than the coefficient of diffusion of lithium in carbons (regarding this subject, see K. Zaghib et al., J. Power Sources, 81-82 (1999) 300-305). This characteristic distinguishes $Li_5Ti_5O_{12}$ from the other potential candidates for power applications, such as PNGV and GSM pulses. During the intercalation of lithium, the structure of $Li_4Ti_5O_{12}$ does not vary in volume, which makes this electrode very stable and thus safe. This study was carried out by Ozhuku and reported in J. Electrochem. Soc., 140, 2490 (1993) by X-ray diffraction and by scanning microscopy in situ by Zayhib et al. (and reported in Proceeding on Lithium Polymer Batteries, PV96-17, p. 223 in The Electrochemical Society Proceeding Series (1996) and in J. Electro chem. Soc. 145, 3135, (1998).

The material $Li_4Ti_5O_{12}$ because of its lack of volume expansion (also called as zero volume expansion (ZEV)) has been easily used in polymer, ceramic or glass electrolyte batteries, which ensures good cycling stability. In addition, the good behavior of this anode at 1.5 V promotes the use of any type of liquid electrode, such as ethylene carbonate (EC), propylene carbonate (PC) or mixtures of these two. At this potential level, there is no passivation film formation on the electrode, which on one hand prevents the release of gas due to the electrolyte reduction, and on the other hand, prevents loss of capacity. This operation potential increases the life span of the battery, especially for stand-by type applications because of its character as electrode without passivation film. The use of $Li_4Ti_5O_{12}$ as an anode does not require any prior forming of the battery.

In addition, in the configuration of the plastic metal type battery, a secondary pocket is reserved for gas due to electrolyte decomposition when carbon is used as the anode. The fact that the battery with $Li_4Ti_5O_{12}$ does not need either forming or a reserve pocket for degassing will reduce the manufacturing cost of the battery.

The insertion reaction of $Li_4Ti_5O_{12}$ occurs as follows:

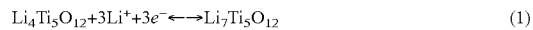

$$Li_4Ti_5O_{12} + 3Li^+ + 3e^- \leftrightarrow Li_7Ti_5O_{12} \qquad (1)$$

In the literature (T. Ohzuku, et al., J. Electrochem. Soc., 140, 2490 (1993)) and (J. Schoonman et al., the 198th Meeting of the Electrochemical Society Phoenix, Extend Abstract No. 91, 92 and 98, October 2000), the $Li_4Ti_5O_{12}$ is mentioned as being able to be obtained by a binary mixture of a mixture of LiOH and $TiO_2$ where the synthesis temperature is greater than 600° C. Residual impurities of the $TiO_2$, $Li_2TiO_3$ and/or other type in the mixture limit the electrode capacity and limit the size of the particles.

In the document entitled "Solid state lithium ion batteries using carbon or an oxide as negative electrode", J. Electrochem. Soc., Vol. 145, 3135, (1998) K. Zaghib, M. Armand and M. Gauthier describe all the different possible applications of $Li_4Ti_5O_{12}$ as anode or cathode in rechargeable batteries or supercapacitors.

In the document "*Electrochemistry of anodes in solid-state Li-ion polymer batteries*" J. Electrochem. Soc., Vol. 145, No. 9, September 1998, the electrochemical performance of solid-state lithium ion batteries that are produced using an electrolyte based on solid polymers free of solvent is described. A cell based on $Li_4Ti_5O_{12}$ as cathode with lithium as anode, at a rate of C/1 supplies 150 mAh/g, which corresponds to 97% of the efficiency of nominal capacity. The irreversible capacity was high when carbon was used as the negative electrode. However, the sacrificial capacity was very slight when carbon was replaced with a spinel material.

In the document "*Electrochemical study of $Li_4Ti_5O_{12}$, a negative electrode for li-ion polymer rechargeable batteries*" K Zaghib et al. give evidence of the electrochemical stability of a negative electrode for lithium ions containing $Li_4Ti_5O_{12}$ of the same type as that described in the preceding example regarding its coefficient of chemical diffusion for a $Li_4Ti_5O_{12}$ structure of the spinel type which results in a coefficient of diffusion with a value of $-2.10^{-8}$ cm$^2$.s$^{-1}$, which gives a value that is greater in intensity than that of the carbon negative electrodes. Thus the $Li_4Ti_5O_{12}$ electrode offers advantages for electrochemical cells which are safety, long life span and reliability.

The U.S. Pat. No. 6,221,531 describes a structure of the spinel type with the general formula $Li[Ti_{1.67}Li_{0.33-y}M_y]O_4$, wherein $Y<0\leq0.33$ with M representing magnesium and/or aluminum. This structure is presented as useful for making up a negative electrode for a non-aqueous electrochemical cell and in a non-aqueous battery comprising a plurality of cells, connected electrically, each cell comprising a negative electrode, an electrolyte and a positive electrode, the negative electrode being made up of this spinel structure.

Thus there was a need for new types of particles free of the limitations and/or disadvantages commonly associated with particles of the prior art previously mentioned and, in particular, making possible the production of high-performance electrochemical devices with cycling stability, easy to spread on a support such as an electrode and with good flexibility as regards to the thickness of the electrode that will be produced using these particles.

IN THE DRAWINGS

FIG. 1: illustrates the different applications of the $Li_4Ti_5O_{12}$ particles (coated with carbon or not) as anode or as cathode for batteries and supercapacitors.

Figure 2:
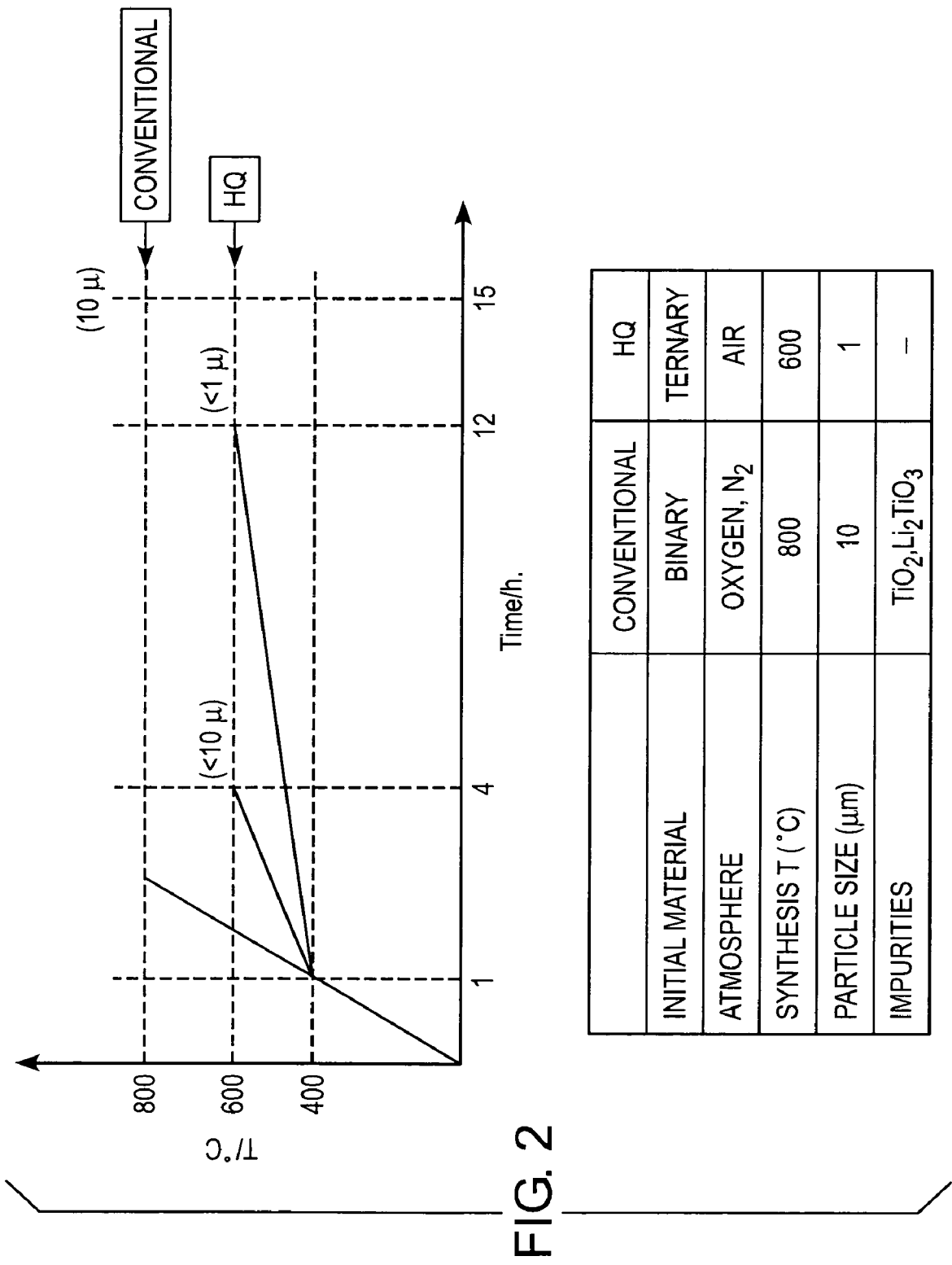

FIG. 2: illustrates comparative performances of a process according to the invention compared with those of a classic process such as described in Prog. Batt. Solar Cells, 9 (1990), 209.

Figure 3:
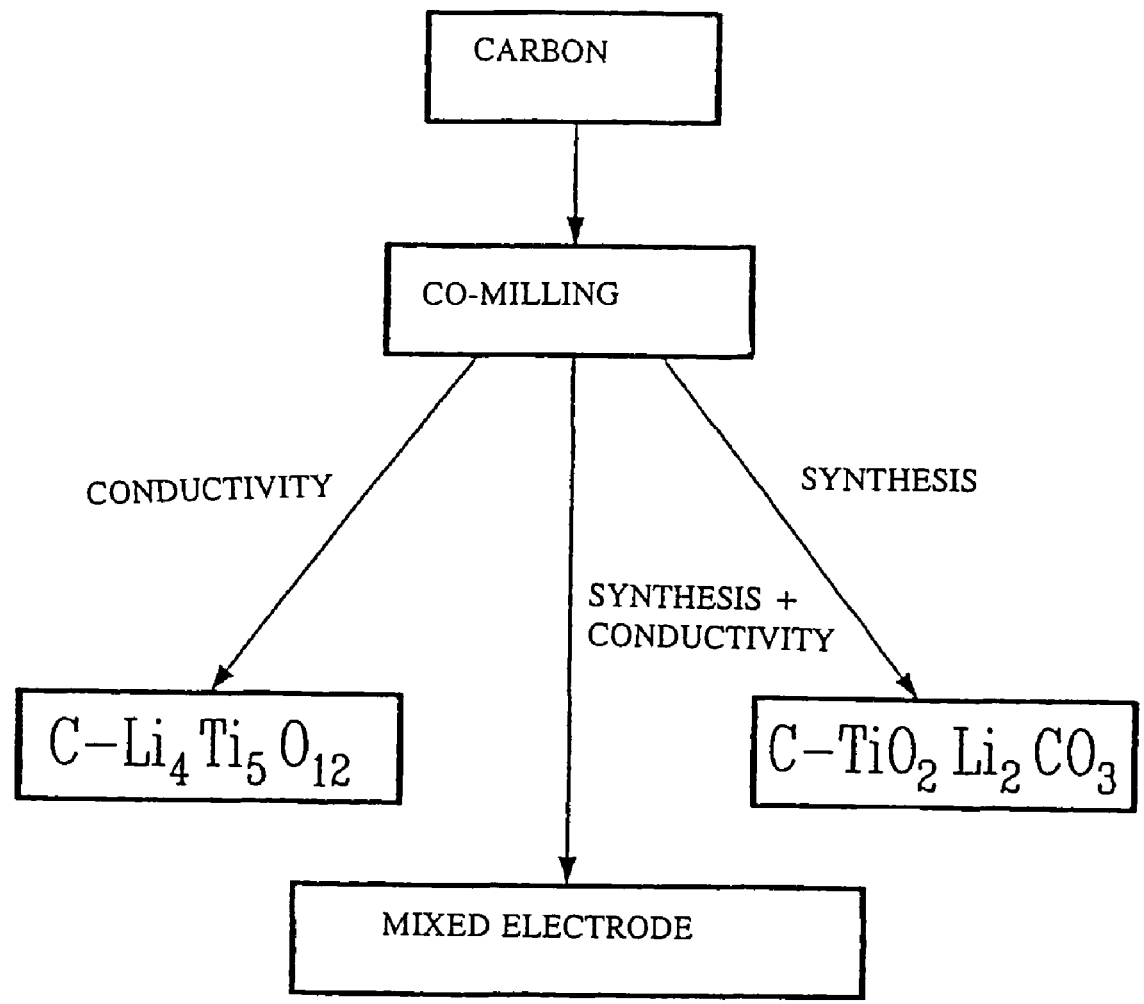

FIG. 3: illustrates the double role of carbon in the preparation process for new particles and in the composition of the carbon layer that coats them.

Figure 4:
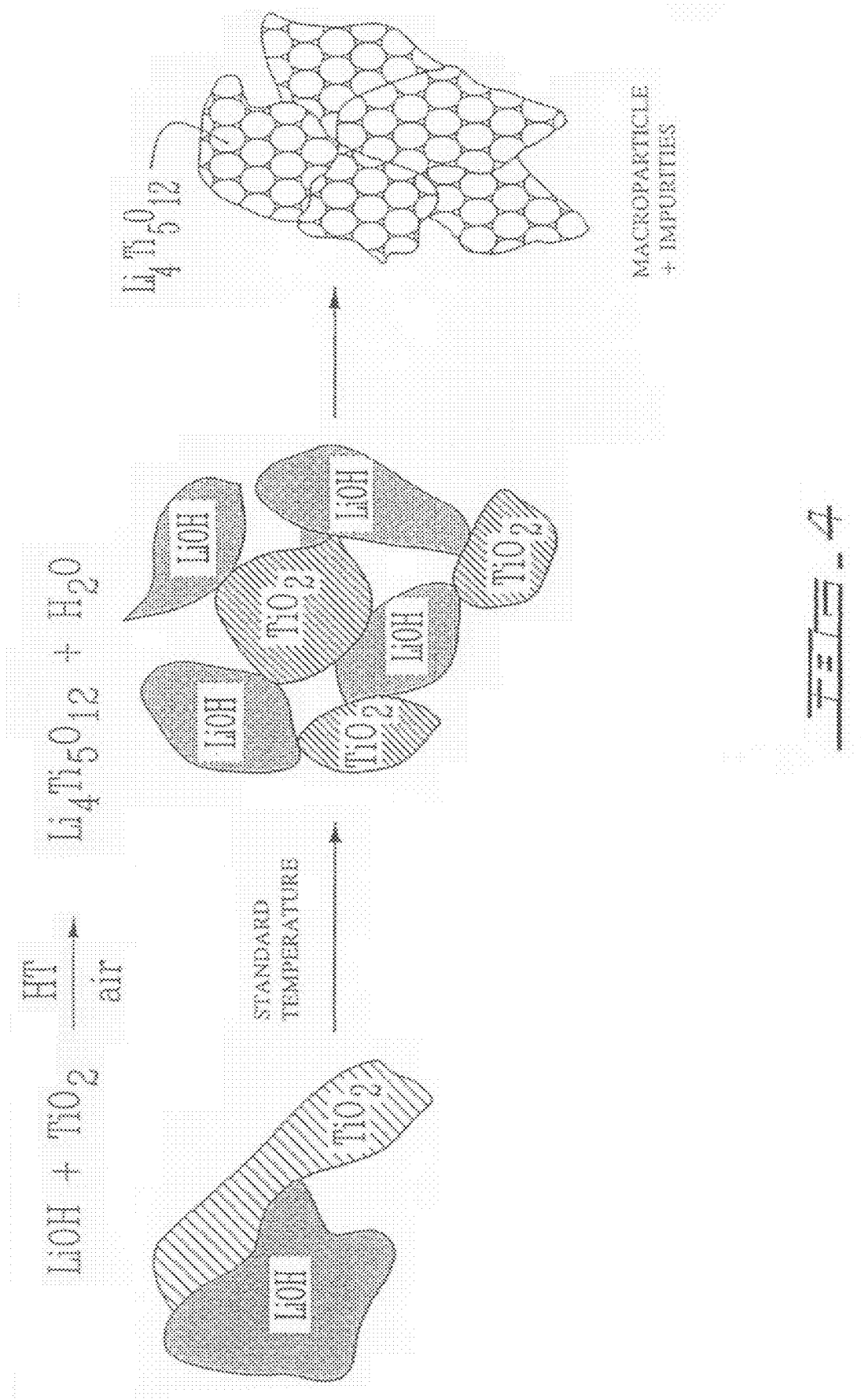

FIG. 4: illustrates a classic formation process for $Li_4Ti_5O_{12}$ (macroscopic particle), in the absence of carbon; this process makes it possible to obtain a spinel structure in the presence of impurities of a $TiO_2$ or other type. This structure is limited for electrochemical performance, to currents less than 2 C.

Figure 5:
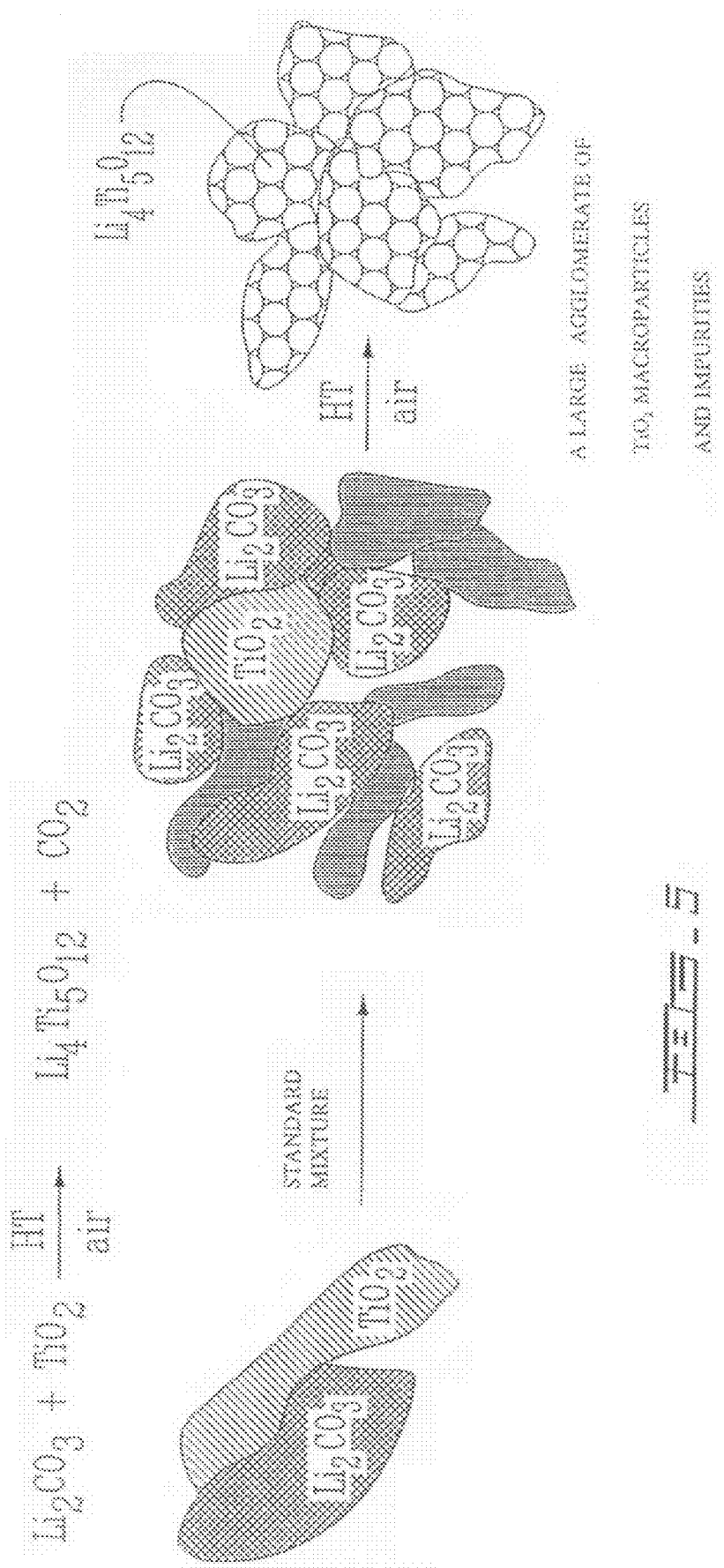

FIG. 5: illustrates the same process illustrated in FIG. 4, with the exception of the reagent LiOH which is substituted by $Li_2CO_3$; this type of process yields a formation of agglomerates of the $Li_4Ti_5O_{12}$ type.

Figure 6:
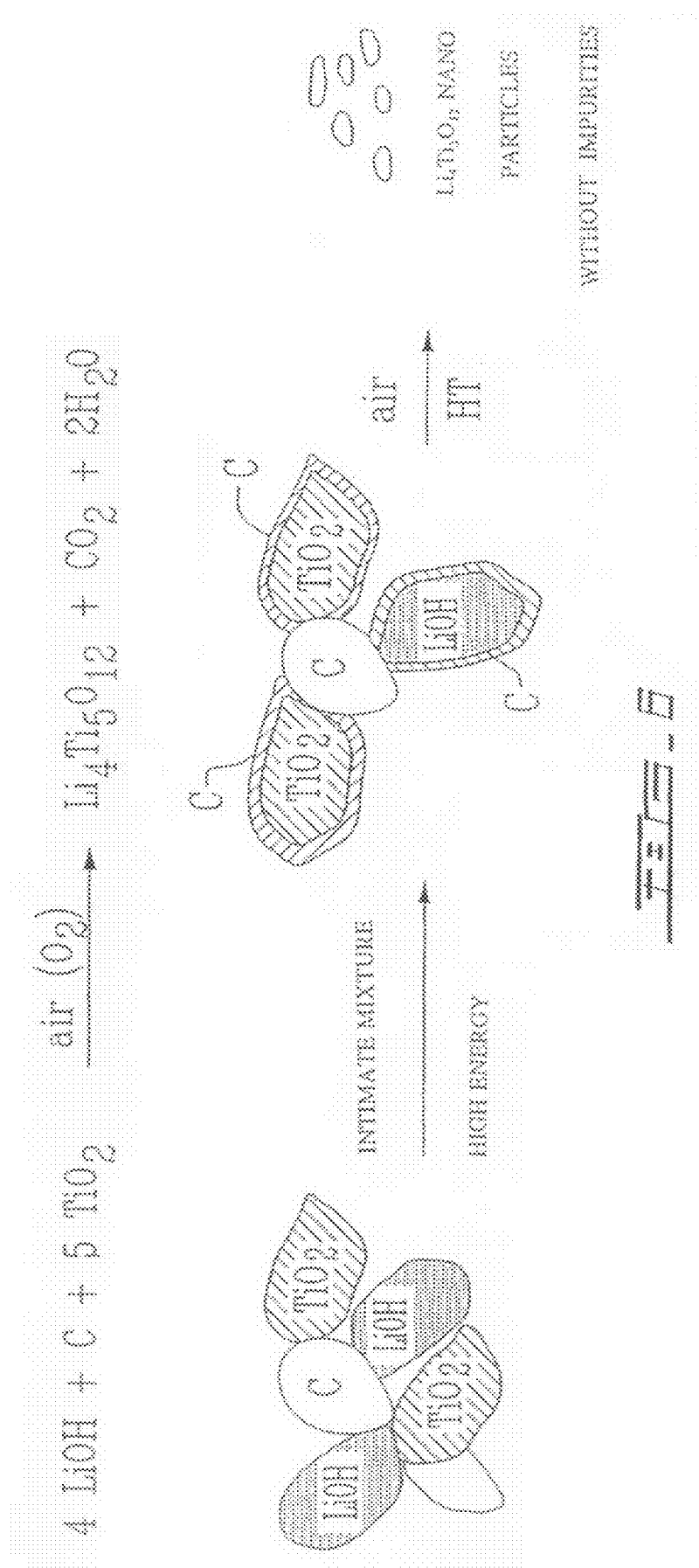

FIG. 6: illustrates a process according to the invention for the formation of nano-particles of $Li_4Ti_5O_{12}$ from a ternary mixture LiOH—C—$TiO_2$, intimately mixed at high energy, this mixture is heated at 400° C. then to 600° C. This type of process gives rise to the formation of nano-agglomerates of $Li_4T_5O_{12}$.

Figure 7:
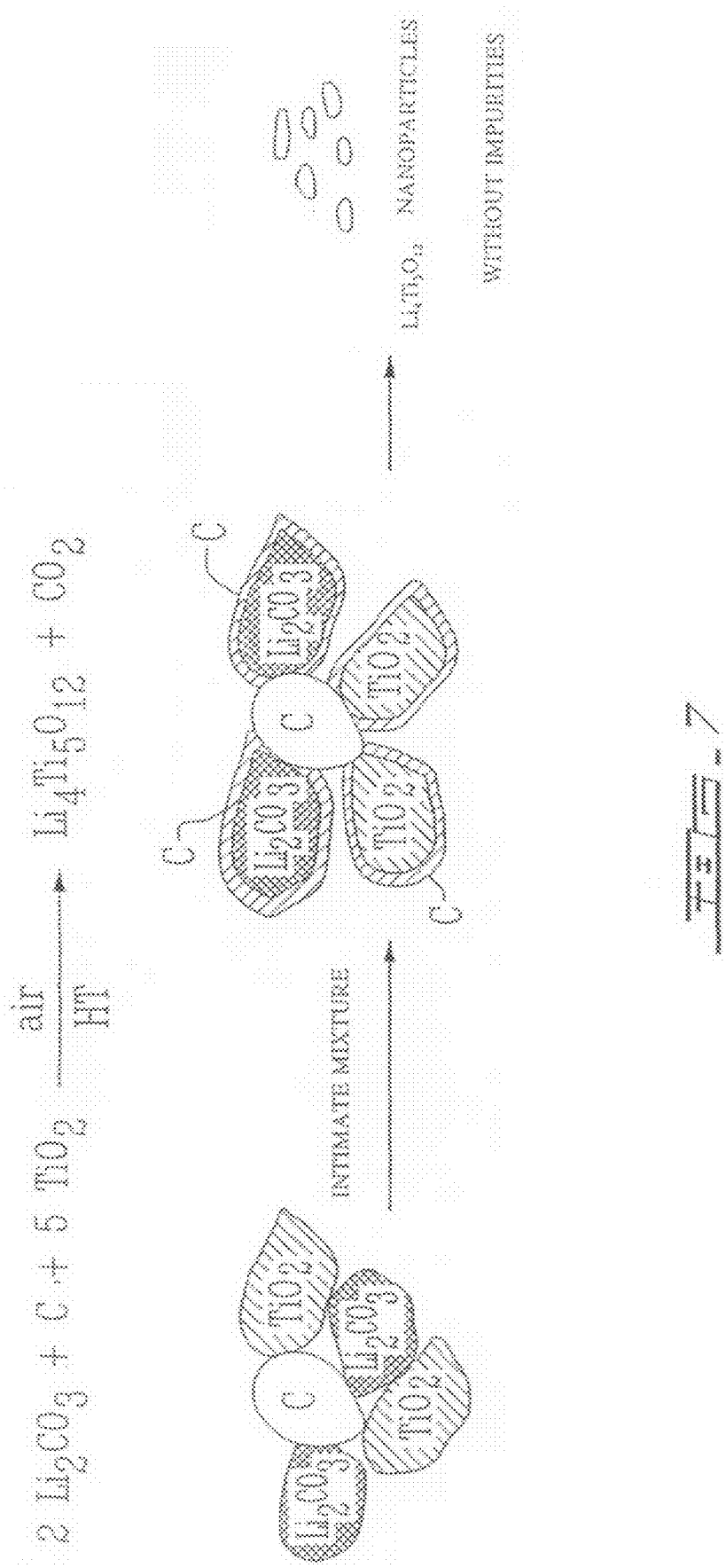

FIG. 7: illustrates a process similar to the one shown in FIG. 6, with the exception that LiOH is substituted by $Li_2CO_3$; this type of process leads to the formation of $Li_4Ti_5O_{12}$ nano-agglomerates.

Figure 8:
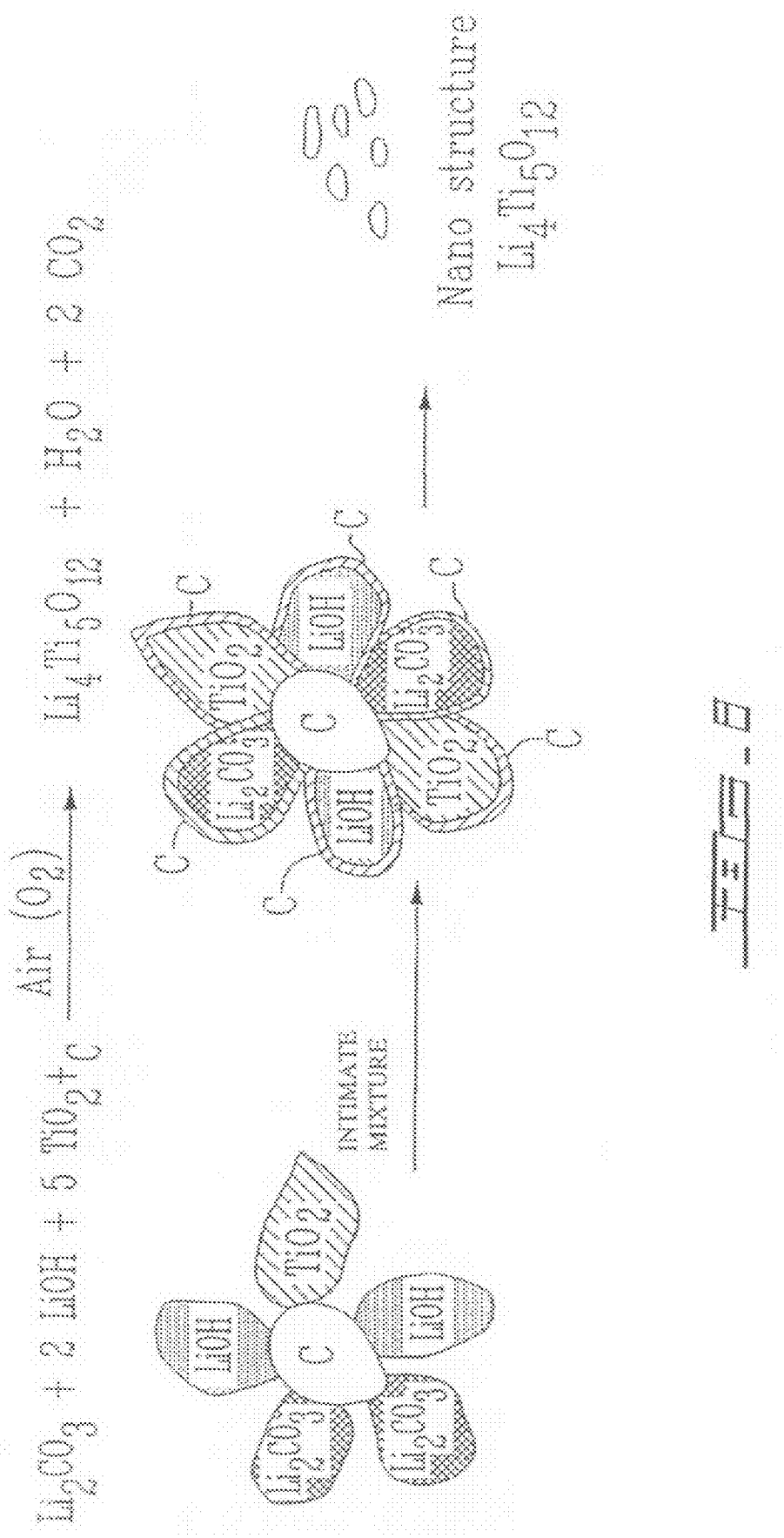

FIG. 8: illustrates a process similar to the one illustrated in FIG. 7, by adding $Li_2CO_3$ to the initial product; this type of process makes it possible to obtain $Li_4Ti_5O_{12}$ nano-agglomerates.

Figure 9:
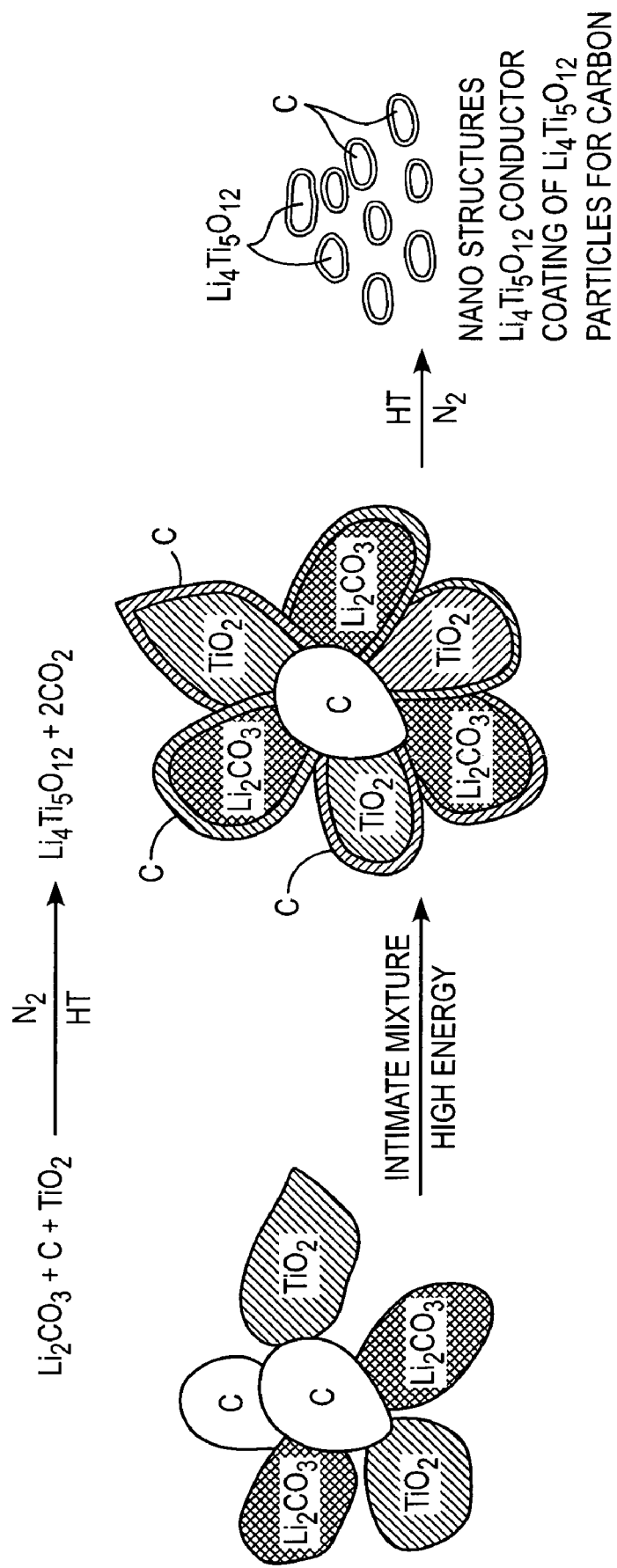

FIG. 9: illustrates a process similar to those shown in FIGS. 6 and 7, with the exception that calcination is carried out in an inert atmosphere; this type of process makes it possible to obtain $Li_4Ti_5O_{12}$ nano-agglomerates of $Li_4Ti_5O_{12}$ coated with carbon. This structure gives exceptional electrochemical performance at high current density (12 C).

Figure 10:
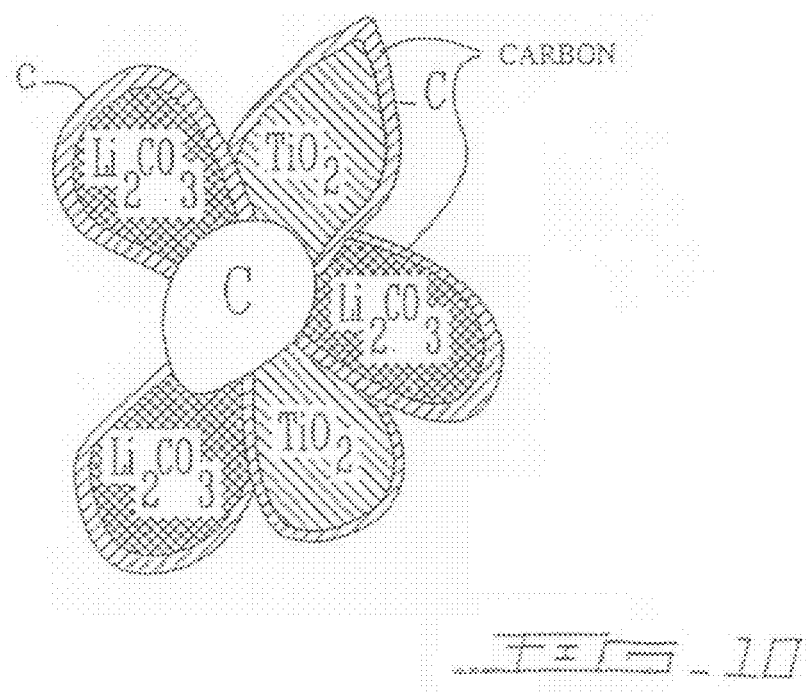

FIG. 10: illustrates the advantages of a pretreatment of the mixture milled at high energy. Dry process. Homogeneous precursor. Homogeneous specific surface area. Coating of particles with carbon. Direct contact of particle with carbon. Direct contact via carbon with the reactive particles. Carbon is a very good thermal conductor. Low contamination. Homogeneous dispersion. Acceleration or rapid synthesis. Obtaining a mixture of nanostructures after the thermal treatment.

Figure 11:
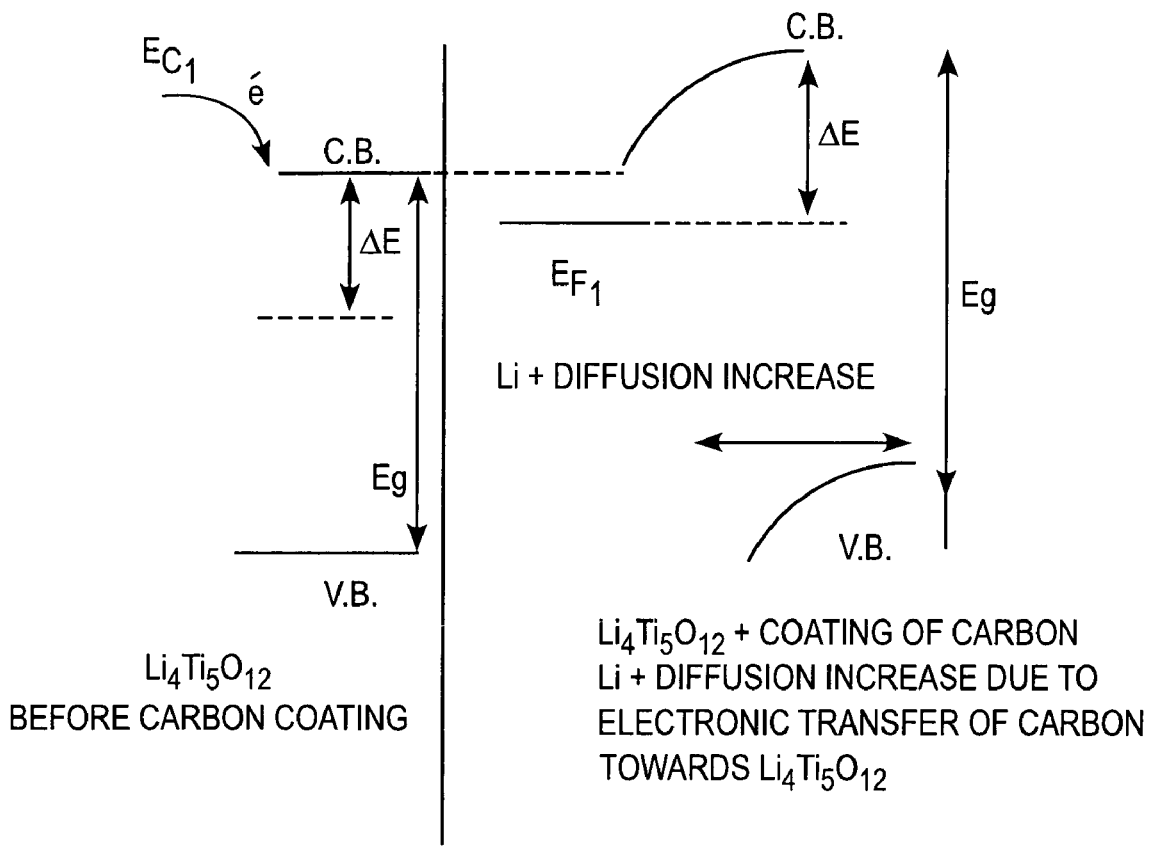

FIG. 11: illustrates the mechanism and the role of carbon coating, the latter coating making it possible to obtain a large diffusion of lithium in $Li_4Ti_5O_{12}$ and obtain 90% of the nominal capacity at 12 C.

Figure 12:
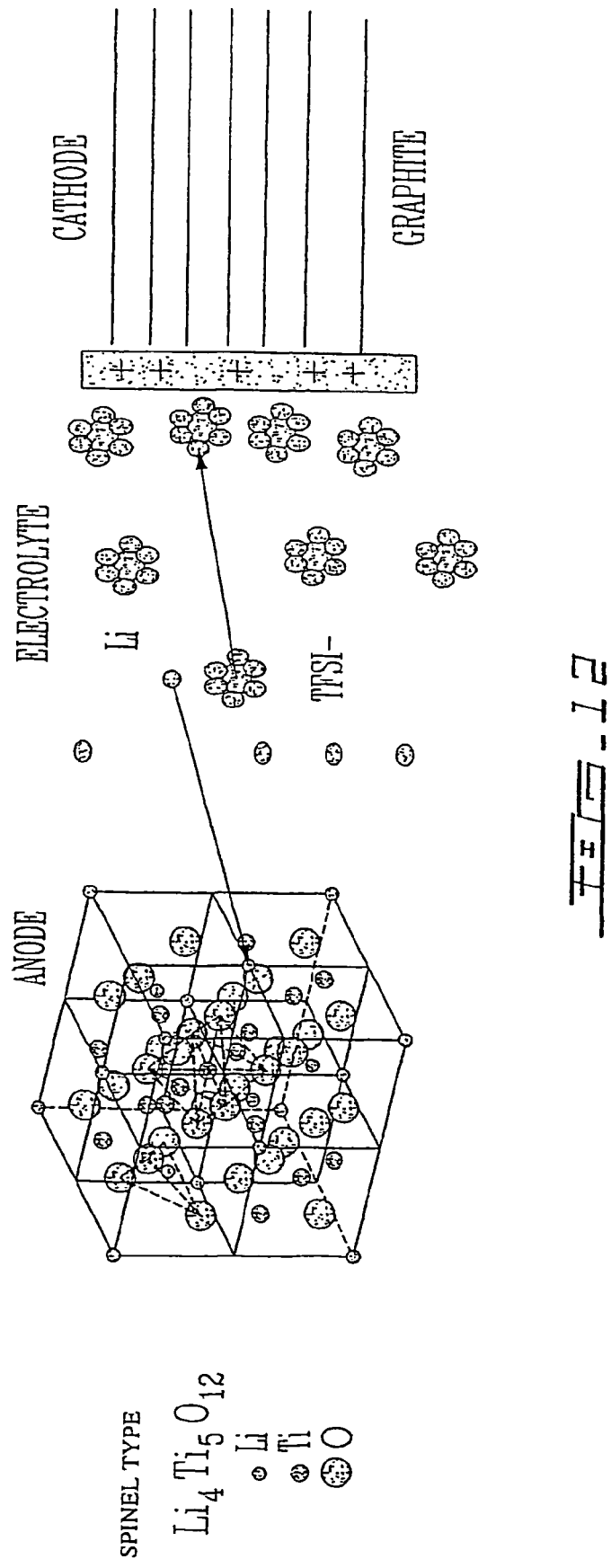

FIG. 12: illustrates the mechanism of the technology of hybrid supercapacitors using an anode of the nano-$Li_4Ti_5O_{12}$ type.

Figure 13:
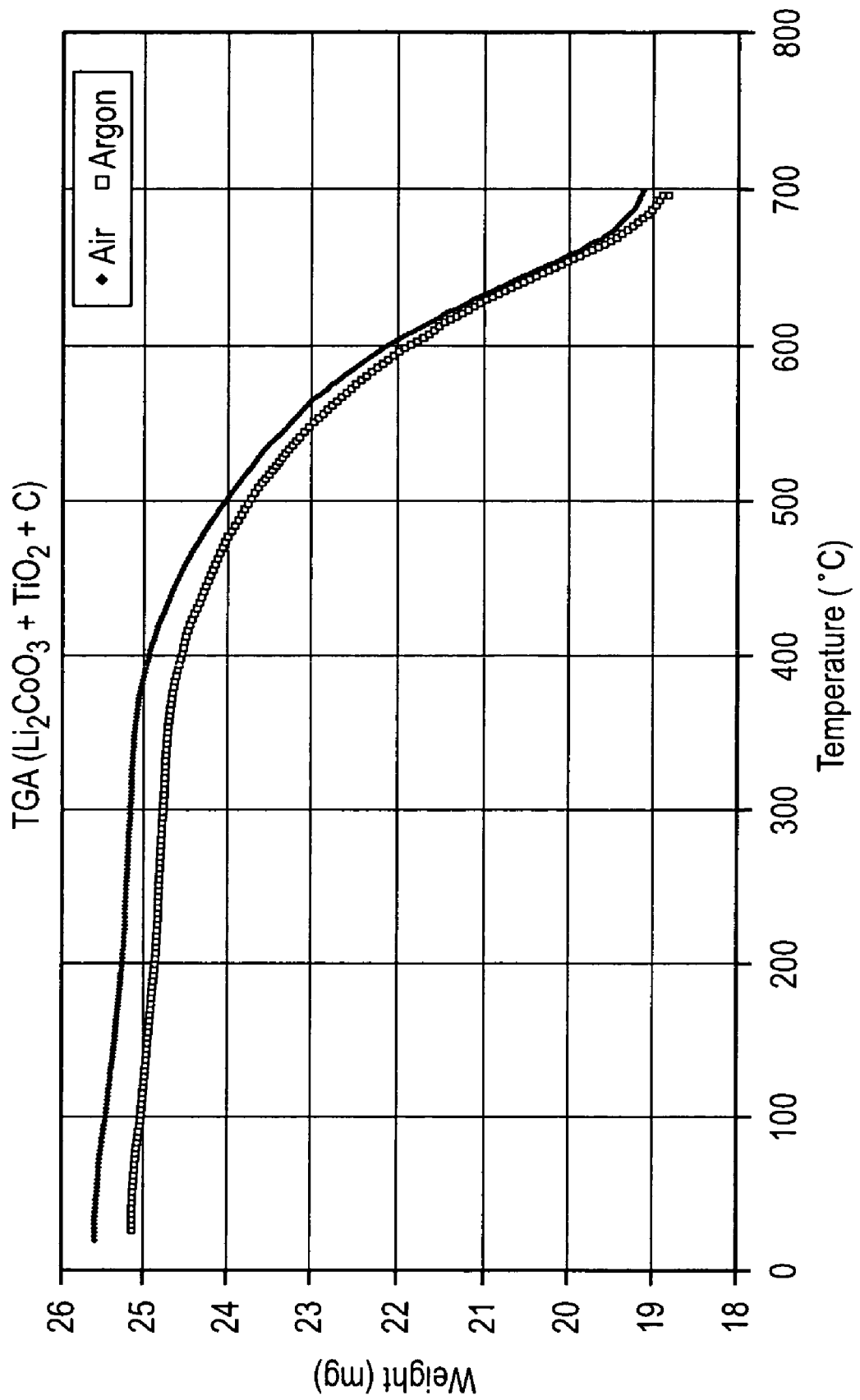

FIG. 13: is the TGA curve of a mixture of $TiO_2$+$Li_2CO_3$+carbon after milling at high energy for 2 hours, in air and in argon; the reaction starts at 400° C. (in argon and in air).

Figure 14:
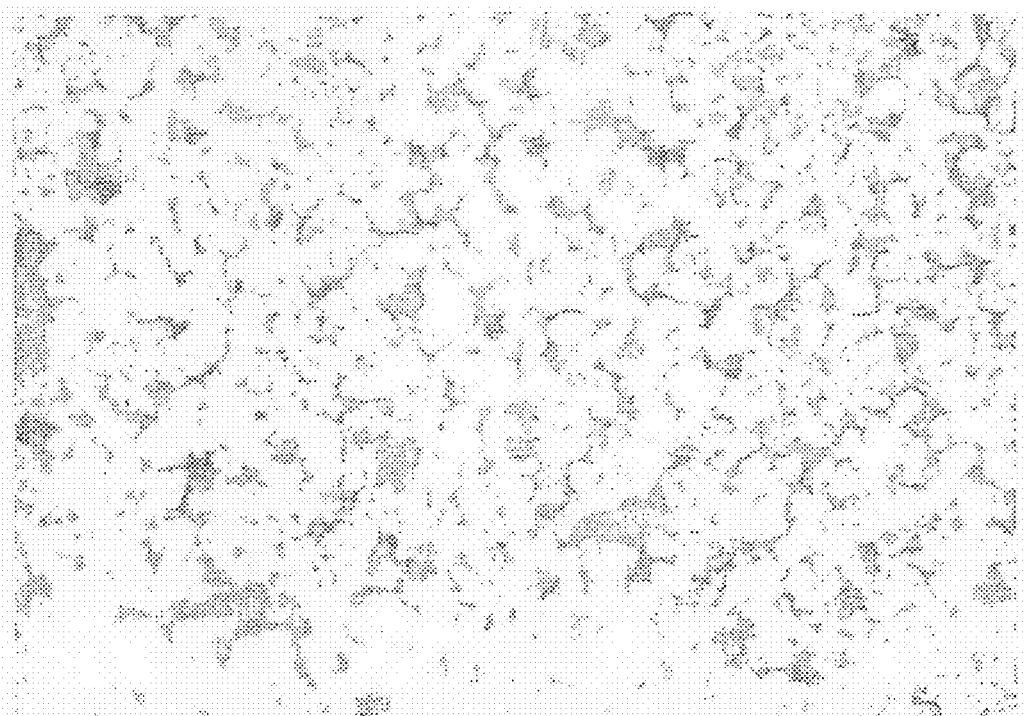

FIG. 14: is a SEM photo of microscopic particles of $Li_4Ti_5O_{12}$ obtained from a mixture of $Li_2CO_3$+$TiO_2$.

Figure 15:
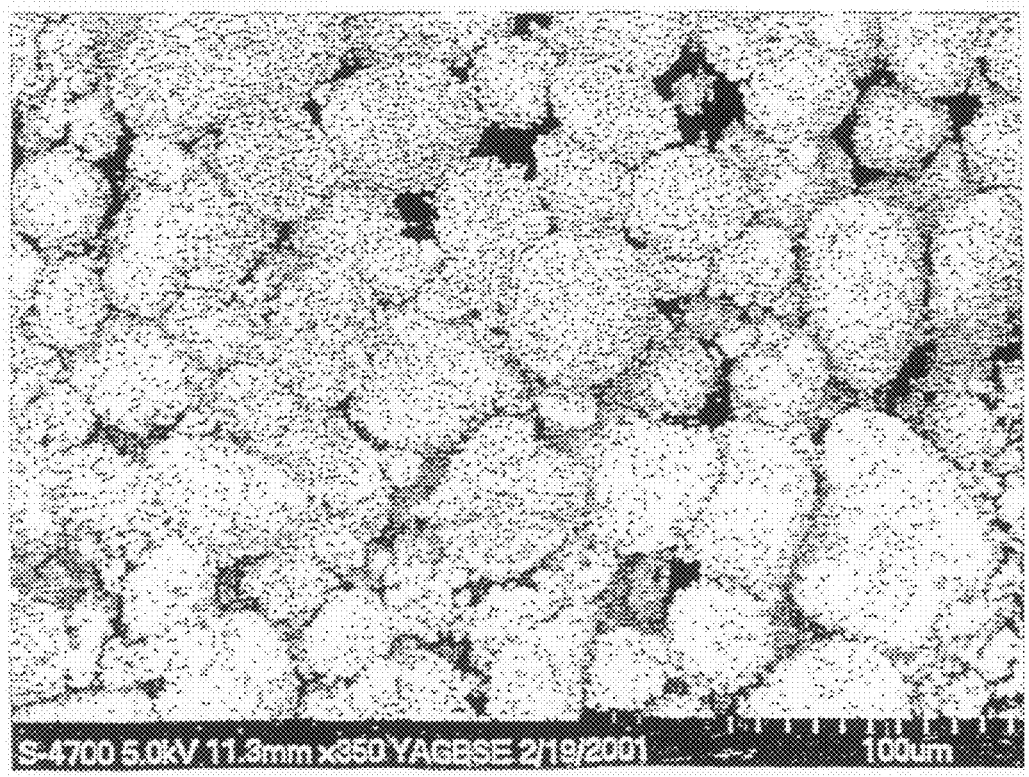

FIG. 15: is a SEM photo of nanoscopic particles of $Li_4Ti_5O_{12}$ obtained using a mixture of $Li_2CO_3$+$TiO_2$+carbon.

Figure 16:
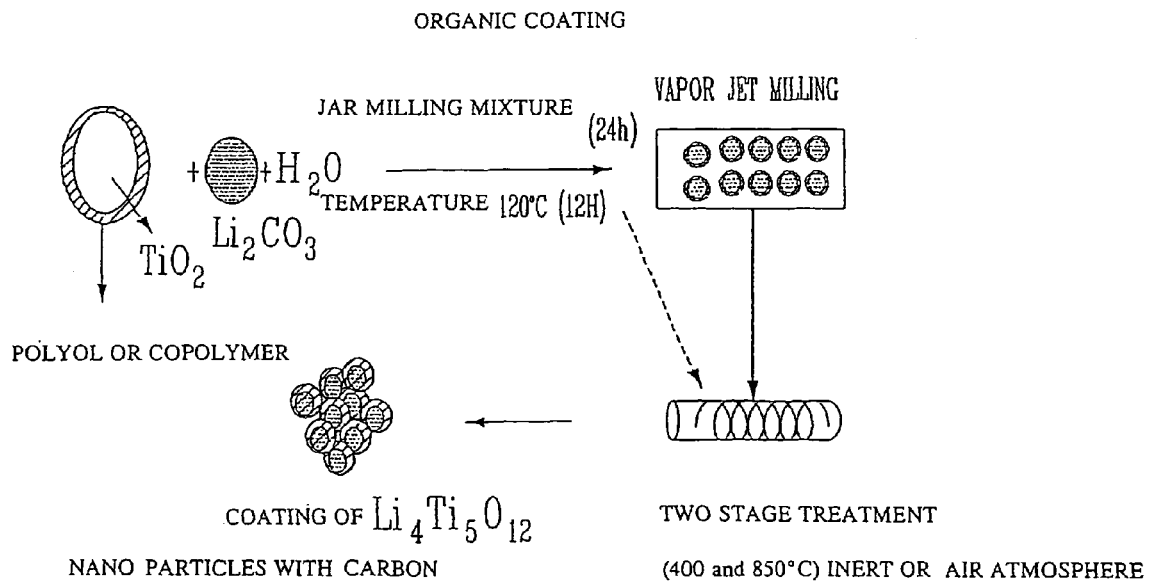

FIG. 16: illustrates a manufacturing process for nanoparticles of $Li_4Ti_5O_{12}$ coated with carbon and obtained by coating the particles of $TiO_2$ with organic formulations of the polyol type and/or of the PE-PO type; the thermal treatment carried out in inert atmosphere transforms the organic part into carbon. This process is carried out in the step of mixed Jar milling with solvent or dry.

Figure 17:
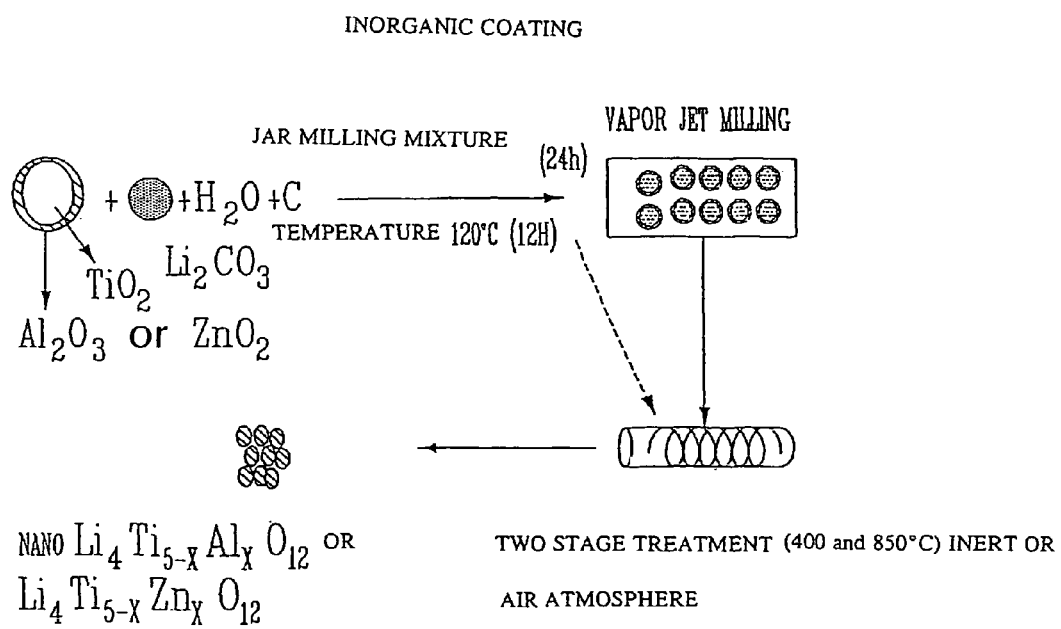

FIG. 17: illustrates a manufacturing process for nanoparticles of $Li_4Ti_5O_{12}$ coated with carbon and obtained by coating the particles of $TiO_2$ with inorganic formulations of the $Al_2O_3$, $ZrO_2$ type, the thermal treatment carried out in inert atmosphere transforming the organic part to carbon. This process is carried out in the step of mixed Jar milling with solvent or dry.

FIG. 18: illustrates a manufacturing process for nanoparticles of $Li_4Ti_{(5-)}AlO_{12}$ coated with carbon and obtained by coating the particles of $TiO_2$ using a hybrid inorganic-organic formulation.

SUMMARY OF THE INVENTION

The present invention concerns a synthesis process for new particles of the formula $Li_4Ti_5O_{12}$, of the formula $Li_{(4-\alpha)}Z_\alpha Ti_5O_{12}$ or of the formula $Li_4Z_\beta Ti_{(5-\beta)}O_{12}$, wherein $\alpha$ represents a number greater than zero and less than or equal to 0.33, $\beta$ represents a number greater than 0 and less than or equal to 0.5, Z represents a source of at least one metal, preferably chosen from the group made up of Mg, Nb, Al, Zr, Ni, Co. These particles are coated with a layer of carbon. Use of these particles in electrochemical systems also constitutes an object of the present invention.

DESCRIPTION OF THE INVENTION

A first object of the present invention consists of a process that makes possible the preparation of particles comprising:
  a core of $Li_4Ti_5O_{12}$, a core of $Li_{(4-\alpha)}Z_\alpha Ti_5O_{12}$ or a core of $Li_4Z_\beta Ti_{(5-\beta)}O_{12}$, $\alpha$ representing a number greater than zero and less than or equal to 0.33, $\beta$ representing a number greater than 0 and less than or equal to 0.5, Z representing a source of at least one metal, preferably chosen from the group made up of Mg, Nb, Al, Zr, Ni, Co; and
  a coating of carbon.

According to an advantageous embodiment, this synthesis process makes possible the preparation of particles of $Li_4Ti_5O_{12}$ (preferably with spinel structure) coated with carbon, said particles comprising from 0.01 to 10%, preferably 1 to 6%, and still more preferably around 2% by weight of carbon, the quantity of carbon being expressed with respect to the total mass of $Li_4Ti_5O_{12}$ particles;

said process comprising the steps of
a) preparation of a dispersion of a ternary mixture (preferably an intimate ternary mixture) of $TiO_x$—$Li_zY$-carbon, wherein
x represents a number between 1 and 2,
z represents 1 or 2, and
Y represents a radical chosen among $CO_3$, OH, O and $TiO_3$ or a mixture of them; and
b) heating of the dispersion obtained in the preceding step,
the operating conditions, more specifically the concentration conditions of components of the ternary mixture submitted to dispersion, being chosen in such a way as to yield a conversion, preferably a complete conversion, of the initial products into $Li_4Ti_5O_{12}$.

According to another advantageous embodiment, the process according to the invention makes possible the synthesis of particles of $Li_{(4-\alpha)}Z_\alpha Ti_5O_{12}$ (preferably with spinel structure) coated with carbon, α representing a number greater than zero and less than or equal to 0.33, Z representing a source of at least one metal, preferably chosen from the group made up of Mg, Nb, Al, Zr, Ni, Co, said particles comprising from 0.01 to 10%, preferably 1 to 6%, and still more preferably around 2% by weight of carbon, the quantity of carbon being expressed with respect to the total mass of $Li_{(4-\alpha)}Z_\alpha Ti_5O_{12}$ particles;

said process comprising the steps of
a) preparation of a dispersion of an intimate ternary mixture of $TiO_x$LiY-carbon, wherein
x represents a number between 1 and 2,
z represents 1 or 2, and
Y represents a radical chosen among $CO_3$, OH, O and $TiO_3$ or a mixture of them; and
b) heating of the dispersion obtained in the preceding step, preferably at a temperature comprised between 400 and 1,000° C.,
the operating conditions, more specifically the concentration conditions of components of the ternary mixture submitted to dispersion, being chosen in such a way as to yield a conversion, preferably a complete conversion, of the initial products into $Li_{(4-\alpha)}Z_\alpha Ti_5O_{12}$, and
the source of at least one metal Z being added to the reaction mixture, preferably in step a) of said process in a content that is preferably from 0.1 to 2% by weight, expressed with respect to the mass of said ternary mixture.

Operating conditions that make possible the specific preparation of particles of the formula $Li_{(4-\alpha)}Ti_5O_{12}$ are, more specifically, a control of the initial quantities of each of the compounds present in the ternary mixture that is used for preparation of the dispersion.

According to another embodiment, the process of the invention makes possible the synthesis of particles of the formula $Li_4Z_\beta Ti_{(5-\beta)}O_{12}$ (preferably with spinel structure), wherein β is greater than 0 and less than or equal to 0.5, coated with carbon, Z representing a source of at least one metal, preferably chosen from the group made up of Mg, Nb, Al, Zr, Ni, Co, said particles comprising from 0.01 to 10%, preferably 1 to 6%, and still more preferably around 2% by weight of carbon, the quantity of carbon being expressed with respect to the total mass of $Li_4Z_\beta Ti_{(5-\beta)}O_{12}$ particles;

said process comprising the steps of
a) preparation of a dispersion of an intimate ternary mixture of $TiO_x$—LiY-carbon, wherein
x represents a number between 1 and 2,
z represents 1 or 2, and
Y represents a radical chosen among $CO_3$, OH, O AND $TiO_3$ or a mixture of them; and
b) heating of the dispersion obtained in the preceding step, preferably to a temperature comprised between 400 and 1,000° C.,
the operating conditions, more specifically the concentration conditions of components of the ternary mixture submitted to dispersion, being chosen in such a way as to yield a conversion, preferably a complete conversion, of the initial products into $Li_4Z_\beta Ti_{(5-\beta)}O_2$, and the source of at least one metal Z being added to the reaction mixture, preferably in step a) of said process in a content that is preferably from 0.1 to 2% by weight, expressed with respect to the mass of said ternary mixture,
the operating conditions that make possible the specific preparation of particles of the formula $Li_4Z_\beta Ti_{(5-\beta)}O_{12}$ are, more specifically, a control of the initial quantities of each of the constituents present in the ternary mixture that is used for preparation of the dispersion.

According to an advantageous embodiment of the process, the dispersion of the ternary mixture is heated at a temperature of around 600° C.

Still more advantageously, the dispersion is heated in two steps, the first step being carried out until the dispersion reaches a temperature of about 400° C., the second step being carried out at approximately 600° C.

The first step is preferably carried out by rapid heating at around 400° C., preferably during a period of 1 to 4 hours.

The second step is carried out by slow heating, preferably for at least four hours.

According to another advantageous embodiment of the process, at least one step, which is preferably step a), is carried out in air.

According to another advantageous embodiment of the process, at least one step, which is preferably step b), is carried out at least partially in inert atmosphere.

The dispersion of the ternary mixture is advantageously prepared using water and/or at least one solvent that is preferably an organic solvent. This organic solvent is advantageously chosen from the group made up of ketones, saturated hydrocarbons, unsaturated hydrocarbons, alcohols and mixtures of them, still more preferably the dispersion of the ternary mixture is prepared using water, acetone, heptane, toluene or using a mixture of them.

Said dispersion is also prepared dry, without solvent.

According to another preferred embodiment, a compound $Li_zY$, which comprises at least one compound chosen from the group made up of $Li_2O$, $Li_2CO_3$ and LiOH, is chosen. Still more preferably, the $Li_zY$ compound comprises exclusively $Li_2CO_3$, said $Li_2CO_3$ preferably being present in a ratio of 25 to 30% by weight with respect to the total mass of the ternary mixture.

Advantageously, the dispersion is carried out by mechanical milling, preferably by high-energy mechanical milling, preferably dry and/or by Jar milling, preferably with a solvent.

According to another preferred embodiment, a $TiO_x$ compound of the anatase or rutile $TiO_2$ type (preferably the anatase $TiO_2$ type), or a mixture of both, is chosen and $TiO_2$ is preferably present in said ternary mixture in concentrations of 58 to 71% by weight.

The compound $Li_zY$ preferably comprises $Li_2TiO_3$, this $Li_2TiO_3$ preferably being present in a quantity of 43 to 48% by weight of $Li_2TiO_3$ with respect to the total mass of the ternary mixture.

The carbon used to carry out the process according to the invention may come from any source. Advantageously, the carbon is chosen from the group made up of natural or artificial graphite, carbon black (preferably acetylene black), Shawinigan black, Ketjen black and cokes (preferably petroleum coke) and is added to the reaction mixture, preferably at the beginning of the preparation of the dispersion of the ternary mixture.

The carbon can also be produced in the course of said process, preferably from at least one free organic material, such as a polymer, present in the reaction mixture.

The carbon can also be produced at the surface of the particles by calcination of an organic and/or inorganic material deposited, in the course of said process, on the surface of the $Li_4Ti_5O_{12}$ particles and/or on the surface of the particles based on $Li_4Ti_5O_{12}$ and/or on the surface of at least one of the reagents used (preferably the $TiO_2$) for the preparation of the dispersion of said ternary mixture.

Preferably, the carbon used is in the form of particles having a specific surface area greater than or equal to 2 $m^2/g$, preferably in the form of particles having a specific surface area greater than or equal to 50 $m^2/g$.

According to an advantageous embodiment, the process of the invention is carried out in the presence of an atmosphere containing oxygen, a part of the carbon present in the reaction mixture then being consumed during said process.

According to another advantageous embodiment, the coating of carbon is obtained from the presence, in the reaction mixture, of a powder of Shawinigan carbon and/or at least one polymer, which is preferably a polyol or a polyethylene-polyoxide ethylene copolymer.

According to another advantageous embodiment, as an initial product $TiO_2$ that is coated with at least one inorganic material, with an inorganic material that preferably comprises an aluminum oxide and/or a zirconium oxide and still more preferably at least one organic material that comprises $Al_2O_3$ and/or $ZrO_2$, is used. According to another variation, $TiO_2$ that is coated with a hybrid inorganic-organic material is used.

A second object of the present invention is made up of particles that can be obtained by use of one of the processes previously defined for the first object of the invention.

These particles comprise a core coated with carbon, the core of said particles being:
  based on $Li_4Ti_5O_{12}$; or
  based on $Li_{(4-\alpha)}Z_\alpha Ti_5O_{12}$, wherein $\alpha$ is greater than zero and less than or equal to 0.33, Z representing a source of at least one metal, preferably chosen from the group made up of Mg, Nb, Al, Zr, Ni, Co; or
  based on at least one compound of the formula $Li_4Z_\beta Ti_{(5-\beta)}O_{12}$ with $\beta$ greater than 0 and/or less than or equal to 0.5, Z representing a source of at least one metal, preferably chosen from the group made up of Mg, Nb, Al, Zr, Ni, Co.

A preferred sub-family is made up of particles wherein the core mainly comprises preferably at least 65% of $Li_4Ti_5O_{12}$, of $Li_{(4-\alpha)}Z_\alpha Ti_5O_{12}$ or $Li_4Z_\beta Ti_{(5-\beta)}O_{12}$ or a mixture of these.

The complement notably being made up of $TiO_2$ $Li_2TiO_3$ or the residues of solvents.

Still more advantageously, the core of the particles according to the invention is exclusively made up of $Li_4Ti_5O_{12}$, of $Li_{(4-\alpha)}Z_\alpha Ti_5O_{12}$ or $Li_4Z_\beta Ti_{(5-\beta)}O_{12}$ or a mixture of these.

A preferred sub-family of particles of the present invention is made up of particles that have a reversible capacity, measured according to the method defined in the description, which is between 155 and 170 mAh/g.

According to an advantageous method, these particles are made up of a core of $Li_4Ti_5O_{12}$ coated with a layer of carbon.

The particles according to the invention are preferably nanostructures. Their size, measured with scanning electron microscopy, is preferably comprised between 10 and 950 nanometers.

The particles according to the present invention are also characterized by their core, which has a size measured using scanning electron microscopy that is preferably comprised between 10 and 500 nanometers.

The carbon coating that covers these particles is characterized by a thickness that, also measured using scanning electron microscopy, is comprised between 10 and 450 nanometers, still more preferably the thickness of the coating varies between 20 and 300 nanometers.

A third object of the present invention is made up of a cathode of an electrochemical generator (preferably a recyclable type electrochemical generator) comprising particles such as previously defined in the second object of the present invention and/or such that can be obtained by using any one of the processes according to the first object of the present invention.

A fourth object of the present invention is made up of an anode for an electrochemical generator (preferably a recyclable type electrochemical generator) comprising particles such as previously defined in the second object of the present invention and/or such that can be obtained by using any one of the processes according to the first object of the present invention.

A fifth object of the present invention is made up of an electrochemical generator (preferably of the rechargeable type) of the lithium type comprising an anode of the metallic lithium type and a cathode of the $Li_4Ti_5O_{12}$ type and/or of the $Li_{(4-\alpha)}Z_\alpha Ti_5O_{12}$ type and/or of the $Li_4Z_\beta Ti_{(5-\beta)}O_{12}$ type or mixtures of them, the cathode in this battery being such as previously defined in the third object of the present invention.

A sixth object of the present invention is made up of an electrochemical generator (preferably of the rechargeable type) of the lithium-ion type comprising an anode of the $Li_4Ti_5O_{12}$ type and/or the $Li_{(4-\alpha)}Z_\alpha Ti_5O_{12}$ type and/or the $Li_4Z_\beta Ti_{(5-\beta)}O_{12}$ type or mixtures of them and a cathode of the $LiFePO_4$, $LiCoO_2$, $LiCoPO_4$, $LiMn_2O_4$ and/or $LiNiO_2$ type or mixtures of them wherein the anode is such as defined in the third object of the present invention.

Preferably, such a generator uses, in the anode and/or in the cathode, a current collector of solid aluminum or of the Exmet type (expanded metal).

A preferred sub-family of the electrochemical generators according to the present invention is made up of generators that do not require any prior forming of the battery.

A seventh object of the present invention is made up of a hybrid-type supercapacitor comprising an anode of the $Li_4Ti_5O_{12}$ type and/or the $Li_{(4-\alpha)}Z_\alpha Ti_5O_{12}$ type and/or the $Li_4Z_\beta Ti_{(5-\beta)}O_2$ type and a cathode of the graphite or carbon type with a large specific surface area, wherein the anode is as defined previously, not requiring any preliminary forming of the supercapacitor.

According to an advantageous embodiment, the anode and/or the cathode of such a supercapacitor is (are) equipped with a current collector of solid aluminum or of the Exmet (expanded metal) type.

According to a preferred embodiment, the electrolyte used in the electrochemical generator or in the supercapacitor is dry polymer, gel, liquid or ceramic in nature.

The Invention is More Specifically Carried Out According to One of the Operating Methods Explained Below:

1—In the Presence of Carbon Powder

The present invention makes available a new synthesis method for $Li_4Ti_5O_{12}$ that is simple, fast and less costly. The synthesis is based on a ternary mixture of $TiO_2$ with anatase or rutile structure, of $Li_2CO_3$ and carbon. The mixture is well dispersed, then submitted to a heating phase that comprises two steps. The first step is rapid heating to 400° C. in air. This temperature stage helps, on one hand, to eliminate the traces of heptane when this solvent is used and, on the other hand, to stimulate the release of $CO_2$. The second step to 600° C. is longer and requires a minimum of 4 hours. This completes the transformation of the ternary mixture to $Li_4Ti_5O_{12}$ with spinel structure. The fineness of the particle size is obtained due to a longer heating time during the second step (see the illustration given in FIG. 2).

Carbon plays a crucial role in the synthesis (for this subject, see FIG. 3). In the first place, the carbon is oxidized with the oxygen in the air, with oxygen coming from $TiO_2$ while releasing $CO_2$. In the second place, titanium reacts with lithium, forming lithiated titanium. The latter oxidizes with air. The synthesis reaction can be schematically illustrated as follows:

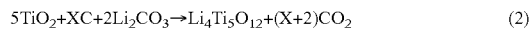

$$5TiO_2 + XC + 2Li_2CO_3 \rightarrow Li_4Ti_5O_{12} + (X+2)CO_2 \qquad (2)$$

An excess of carbon is used to ensure complete transformation. In fact, carbon burns in the presence of air, then its excess reduces $TiO_2$ and $Li_2CO_3$. In this invention, carbons that contain oxygen groups at the surface are used. The latter react with the lithium oxide. The $TiO_2$-carbon-$Li_2CO_3$ mixture can be produced using two methods: in a solvent or in a dry mixture dispersed mechanically. Once the intimate homogeneous powder is obtained, the carbon will play the essential role established according to reaction (2) by obtaining a $Li_4Ti_5O_{12}$ product without impurities.

The use of $Li_2O$ instead of $Li_2CO_3$ works well, however with the least trace of humidity there will be formation of LiOH, which reduces the $Li_4Ti_5O_{12}$ production yield and makes it necessary to maintain the synthesis at 800° C.

The synthesis was also carried out with the $TiO_2$—$Li_2CO_3$-carbon mixture dispersed by high-energy mechanical milling (HEMM). The main step before the passage to HEMM is to disperse the ternary mixture well in order to obtain a homogeneous mixture (FIG. 10). For this, first a co-milling for 15 minutes to 2 hours is used, in addition, this co-milling also helps to lower the synthesis temperature. This process produces particles on the nanostructure scale of $Li_4Ti_5O_{12}$ (FIGS. 6, 7 and 8), compared to the classic method that makes it possible to carry out the formation of the macroscopic particles (FIGS. 4 and 5). The use of these nanostructure particles makes it easier to spread thin electrodes and increases the diffusion of lithium in the spinel structure for power applications. The $Li_4Ti_5O_{12}$ applications are presented in FIG. 1. In the case where $Li_4Ti_5O_{12}$ is a cathode, the battery produces 1.5 volts, due to the rechargeability of the $Li_4Ti_5O_{12}$, this system becomes very interesting for the rechargeable battery markets, thus replacing the large market of primary alkaline batteries of 1.5 volt.

$Li_4Ti_5O_{12}$ is a white insulating powder, in order to increase its electronic conductivity, it is co-milled with carbon. The latter coats the particles of $Li_4Ti_5O_{12}$ and gives a good conductivity to the electrode at the time of intercalation and disintercalation of lithium and keeps its capacity (mAh/g) stable at elevated currents (mA/g). In fact, carbon plays a double role in this invention, on one hand, it helps to synthesize a final pure product of the $Li_4Ti_5O_{12}$ type by lowering the synthesis temperature, and on the other, it increases the electronic conductivity by co-milling with $Li_4Ti_5O_{12}$ for manufacturing electrodes for an electrochemical generator.

2—In the Presence of Organic Coating on the Surface of the $TiO_2$ Particles

The synthesis of the $TiO_2$ mixture coated with organic material (produced by the Kronos company) with $Li_2CO_3$. The two components are diluted in water. The intimate mixture is obtained by Jar milling for 24 hours. The paste obtained is dried at 120° C. during 12 hours. The mixture is dispersed by "vapour jet milling from the Kronos company." A two stage thermal treatment, 400 and 850° C. in inert atmosphere, yields particles of nano-$Li_4Ti_5O_{12}$ coated with carbon (FIG. 16).

3. In the Presence of Free Organic Material in the Mixture

The synthesis of the mixture of standard $TiO_2$ and an organic material (polyol, PE-PO or other) with $Li_2CO_3$ or LiOH (or mixtures of them. The three components are diluted in water. The intimate mixture is obtained by Jar milling over 24 hours. The paste obtained is dried at 120° C. during 12 hours. The mixture is dispersed by "vapour jet milling from the Kronos company." A two stage thermal treatment, 400 and 850° C. in inert atmosphere, yields nano-particles of $Li_4Ti_5O_{12}$ coated with carbon.

4. In the Presence of Inorganic Coating on the Surface of $TiO_2$ Particles

The synthesis of the mixture of $TiO_2$ coated with an inorganic material of the type $Al_2O_3$, $ZrO_2$ and the like (product from the Kronos company) with $Li_2CO_3$ or LiOH (or a mixture of them). The two components, mixed with the organic material are diluted in water. The intimate mixture is obtained by Jar milling during 24 hours. The paste obtained is dried at 120° C. during 12 hours. The mixture is dispersed by "vapour jet milling from the Kronos company." A two stage thermal treatment, 400 and 850° C. in inert atmosphere, yields particles of $Li_{(4-\alpha)}Z_\alpha Ti_5O_{12}$ or of $Li_4Z_\beta Ti_{(5-\beta)}O_{12}$ coated with carbon (FIG. 17).

5. In the Presence of Hybrid Organic-Inorganic Coating on the Surface of $TiO_2$ Particles The synthesis of the mixture of $TiO_2$ coated with hybrid organic-inorganic material of the polyol type, preferably a high purity polyol, still more preferably trimethylpropane or an ethylene polyethylene-polyoxide copolymer, $Al_2O_3$, $ZrO_2$ or the like (product from the Kronos company) with $Li_2CO_3$ or LiOH (or a mixture of them). The two components are diluted in water. The intimate mixture is obtained by Jar milling for 24 hours. The paste obtained is dried at 120° C. for 12 hours. The mixture is dispersed by vapour jet milling from the Kronos company. Thermal treatment at two stages, of 400 and 850° C. in inert atmosphere, yields nano-particles of $Li_{(4-\alpha)}Z_\alpha Ti_5O_{12}$ or of $Li_4Z_\beta Ti_{(5-\beta)}O_{12}$ coated with carbon (FIG. 18).

6. Use of Nano-$Li_4Ti_5O_{12}$ Coated with Carbon as an Anode in Hybrid Supercapacitor Technology (HSC)

This technology (FIG. 12) uses an insertion anode of the $Li_4Ti_5O_{12}$ type placed face to face with a cathode of the graphite or carbon type with large specific surface area (double layer) with a polymer, gel, liquid or ceramic electrolyte. The advantage of nano-$Li_4Ti_5O_{12}$ coated with carbon (FIG. 11) promotes the diffusion of lithium inside the spinel structure, and in particular, at elevated currents like 12 C (charge-discharge in 5 minutes). At these ratings, the HSC develops 90% of the nominal capacity. The presence of carbon provides good conductivity at the grain level and on the scale of the electrode, which limits the addition of large proportions of carbon to the electrode. This makes it possible to increase the energy density of the HSC.

HSC technology uses two collectors of the Exmet (expanded metal) type in aluminum with an electrolyte having a salt mixture of LiTFSI+LiBF$_4$ or LiTFSI+LiPF$_6$ or LiTFSI+BETi+LiBF$_4$. This mixture makes it possible to have good ionic conductivity and reduces the collector corrosion during high-voltage charging. The energy density of the HSC is around 60 Wh/kg and the capacity obtained is 90% at charging rates of 12 C. HSC technology presents an energy density comparable to Pb-acid or Ni—Cd technologies, in addition this technology has a long cyclability.

It is important to keep in mind that Li-ion technology (graphite/LiCoO$_2$) is limited to currents less than 2 C (30 minutes) and by the number of cycles which is 1200.

EXAMPLES

The following examples are given purely as an illustration and should not be interpreted as constituting any limitation whatsoever of the invention.

Example 1

Preparation in the Presence of Heptane of Particles of Li$_4$T$_5$O$_{12}$ Coated with Carbon 23 g of TiO$_2$ with anatase structure (commercialized by the Kronoss Company, Varennes, Canada under the name XP-406) are mixed with 10 grams of Li$_2$CO$_3$ (Aldrich, Canada) and with 20 grams of Shawinigan black. An excess of carbon black is used to ensure complete transformation of the CO$_2$ and lower the synthesis temperature.

This ternary mixture is placed in a steel container and heptane is added in a powder/liquid ratio of around 35 g/150 ml. The heptane is used to reduce the heat and the friction between the particles of powder and the balls and leaves the product inert. Stainless steel balls are added to homogenize the ternary mixture. After 2 hours of intimate co-milling, a powder with fine particle size is obtained. The success of the co-milling depends on lowering the synthesis temperature. The heating of this co-milled mixture is carried out in two steps. The first step is a rapid heating to 400° C. in air. This temperature stage promotes the elimination of traces of heptane and stimulates the start of CO$_2$ release. It was proven by the loss of weight shown by TGA (Perkin thermal analysis), which is shown in FIG. 13. The second stage consists of slow heating to 600° C. This completes the transformation of the product into Li$_4$Ti$_5$O$_{12}$ with spinel structure. The X-ray spectrum reveals the presence of peaks characteristic of the Li$_4$Ti$_5$O$_{12}$ structure.

Example 2

Dry Preparation of Particles of Li$_4$Ti$_5$O$_{12}$ Coated with Carbon 23 g of TiO$_2$ with anatase structure (XP-406 from the Kronos Company, Varennes) are mixed with 10 grams of Li$_2$CO$_3$ (Aldrich, Canada) and with 20 g of Shawinigan black. Again an excess of carbon black is used to ensure complete transformation of the CO$_2$ and lower the synthesis temperature. This ternary mixture is placed in a dry container with stainless steel balls.

After 2 hours of intimate milling, a powder with a fine particle size is obtained. Heating of this co-milled mixture is carried out in two steps, at 400° C. and then at 600° C. The X-ray spectrum reveals the presence of a spinel structure for the Li$_4$Ti$_5$O$_{12}$ particles thus synthesized.

Example 3

Dry Preparation and Characterization of Nano-Particles of Li$_4$T$_5$O$_{12}$ Coated with Carbon 23 g of TiO$_2$ with anatase structure (XP-406 from the Kronos Company, Varennes) are mixed with 10 grams of Li$_2$CO$_3$ (Aldrich, Canada) and with 2 grams of Shawinigan black. A 6-gram excess of carbon black is again used to ensure complete transformation of the CO$_2$ and to lower the synthesis temperature. This ternary mixture is subject to high-energy mechanical milling (using a shaker mill machine of the type SPEX 8000) in the presence of stainless steel balls in a ball:powder ratio of 10:1. The milling period can vary between 3 minutes and 3 hours, which in the case of the present example is 2 hours. Heating of the co-milled mixture is carried out in two steps. The first step consists of rapid heating to 400° C. in air. The second step consists of slow heating to 600° C. This completes the transformation of the product into Li$_4$Ti$_5$O$_{12}$ with spinel structure. The X-ray spectrum confirms the presence of peak characteristics of the spinel structure of the Li$_4$Ti$_5$O$_{12}$.

FIG. 15, which is a photograph obtained using scanning electron microscopy, shows that the particles of Li$_4$Ti$_5$O$_{12}$ are of nanoscopic size. FIG. 14 relates to a photo obtained in the same manner, but for particles prepared without the addition of carbon shows that the corresponding particles are of macroscopic size.

Example 4

Preparation and Evaluation of an Electrode Containing Particles of Li$_4$Ti$_5$O$_{12}$ Coated with Carbon According to the synthesis process used in example 1, the particles of Li$_4$Ti$_5$O$_{12}$, of poly(vinylidene fluoride) (PVDF) and Ketjen black, present in a mass ratio of 87/10/3 are mixed. This mixture is applied to an exmet electrode of aluminum, then heated for 12 hours with nitrogen scavenging. The electrode thus prepared is then heated for 2 hours in vacuum.

The electrode is then assembled in an electrochemical cell of around 4 cm$^2$ with a Celgard type separator facing the lithium metal. The solvent is of the TESA type (tetra ethyl sulfone amine) ethylene carbonate type with LiTFSI salt (lithium trifluoromethanesulfonimide). The cycling is carried out, at ambient temperature, between 1.2 and 2.5 V. The reversible capacity obtained is 155 mAh/g with an average voltage of 1.55 V.

Example 5

Providing Evidence of the Importance of Good Homogenization of the Ternary Mixture According to the synthesis process described in example 1 above, Li$_4$Ti$_5$O$_{12}$ and Ketjen black, in a volume ratio 40/3, are co-milled in heptane in the presence of stainless steel balls. The mixture is dried, then mixed with a polymer solution based on a polyether marketed by the Baker Hughes Company, USA under the commercial name UNITHOX 750, in a volume ratio 43/57. This mixture is then applied to an aluminum collector, then heated for 12 hours with nitrogen scavenging. The collector thus processed is then heated for 2 hours in vacuum.

The electrode is assembled in an electrochemical cell with about 4 cm$^2$ surface area with a separator of the polymer type based on salt containing polyether prepared in a laboratory, with LiTFSI salt (tetra fluoro sulfur lithium imide) placed face to face with the lithium metal as anode. Cycling is carried out at 80° C. between 1.2 and 2.5 V. The reversible capacity obtained is 155 mAh/g in C/24 and it is 96% of the nominal capacity obtained with a rapid rating in C/1. The cell thus prepared demonstrates good cycling stability, more than 1500 cycles in C/1.

The use of co-milling and carrying out of a good intimate dispersion between the $Li_4Ti_5O_{12}$ oxide and the carbon black ensures the reproducibility of the results.

On the other hand, if the $Li_4Ti_5O_{12}$ oxide is mixed without co-milling with the carbon black and the polymer, in a volume ratio 40/3/57 and if this mixture is applied to an aluminum collector, then heated for 12 hours with nitrogen scavenging and then heated for 2 hours in a vacuum, the electrochemical result obtained by introduction of this electrode in a cell without solvent (completely solid) comprising a polymer (polyether) at 80° C. is 150 mAh/g in C/24 while only 75% of the nominal value is found with fast loading in C/1. In fact, this is due to the poor dispersion between the oxide and the carbon black. In addition, the reproducibility of the results is uncertain.

Example 6

Preparation of $Li_4Ti_5O_{12}$ Using a Binary Mixture of LiOH—$TiO_2$

In this example, particles of $Li_4Ti_5O_{12}$ were prepared using a binary mixture of LiOH—$TiO_2$ (anatase) of 10.5 and 16 g, respectively, heated for 18 hours in air. The X-ray spectrum obtained for these particles establishes the presence of peak characteristics of the spinel structure of $Li_4Ti_5O_{12}$ as well as the presence of traces of $TiO_2$ (rutile) and $Li_2TiO_3$.

The $Li_4Ti_5O_{12}$ powder obtained is mixed with PVDF and with Shawinigan black in a weight ratio 87/10/3. This mixture, which makes up the electrode, is applied to an aluminium Exmet support, then heated for 12 hours with nitrogen scavenging. The electrode thus obtained is then heated for 2 hours in vacuum. Said electrode is assembled in an electrochemical cell about 4 cm² with a Celgard type separator placed face to face with lithium metal as anode. The solvent used is of the TESA type (tetra ethylsulfamide)-ethylene carbonate (1:1 by volume) with 1 mol of LiTFSI (bis(trifluoromethane sulfonimide)).

The reversible capacity obtained in this case is 140 mAh/g. The capacity obtained by the binary type synthesis is thus appreciably less than that obtained by the using ternary synthesis in the presence of carbon.

Example 7

Preparation of $Li_4Ti_5O_{12}$ Particles Coated with Carbon with PVDF and Shawinigan Black According to the synthesis of example 1, $Li_4Ti_5O_{12}$ particles are mixed with PVDF and Shawinigan black in a weight ratio 87/10/3. This mixture is applied on an aluminium Exmet type electrode, then heated for 12 hours with nitrogen scanning. All of this is then heated for 2 hours in vacuum.

Cobalt oxide $LiCoO_2$ is mixed with PVDF and Shawinigan black in a weight ratio 87/10/3. Then the mixture thus obtained is applied to an aluminum Exmet type electrode, the assembly thus obtained is then heated for 12 hours with nitrogen scanning, then in a second step is heated for 2 hours in vacuum.

The $Li_4Ti_5O_{12}$ electrode is assembled in a lithium-ion battery face to face with the $LiCoO_2$ electrode as cathode with a Celgard type separator. The solvent used is of the ethylene carbonate-methyl ethylene carbonate type (1:1 by volume) with 1 mole of lithium bis(trifluoromethane sulfonimide).

The battery voltage tends toward zero volts (33 mV). The battery is cycled between 1.2 V and 2.8 V. The average voltage is around 2.5 V. The irreversible capacity of the first cycle is around 2%. This irreversibility is minimum compared to the conventional carbon/$LiCoO_2$ system. Because of the fact that the two electrodes of the $Li_4Ti_5O_{12}$/$LiCoO_2$ system have no passivation film, the reversible capacity of the battery is stable for more than 500 cycles. Knowing that 2.5 V yields 70% of the average voltage of the lithium-ion system of the carbon/$LiCoO_2$ type, a 30% deficit remains to be recaptured. The lack of energy to be obtained from the carbon/$LiCoO_2$ system can be filled by:

- an Exmet type collector based on aluminum on the anode that makes it possible to reduce the weight of the battery (conventional carbon/$LiCoO_2$ system using copper as current collector for the anode);
- decrease in the quantity of $LiCoO_2$ (absence of irreversibility) while in the classic system, the carbon type anode consumes an irreversible capacity of around 20% to form the passivation film;
- increase in the energy of the $Li_4Ti_5O_{12}$ system by using olivine phosphate of the $LiCoPO_4$ type at high voltage or lithium manganese with high voltage in the cathode;
- use of a thin separator of 10 to 15 microns; and
- simplified thin packaging of the plastic metal type.

Example 8

Preparation of an Electrochemical Cell Using a TESA Type Solvent

According to the operating method used in example 1, $Li_4Ti_5O_{12}$ is mixed with PVDF and Shawinigan black in a weight 87/10/3. This mixture is applied to an aluminium Exmet type electrode.

The assembly thus obtained is heated for 12 hours with nitrogen scavenging, then for 2 hours.

Natural graphite NG7 (Kansai Coke, Japan) is mixed with PVDF in a weight ratio 90/10. This mixture is applied to an aluminium Exmet type electrode. The assembly thus obtained is heated for 12 hours with nitrogen scavenging, then heated 2 hours in vacuum.

The $Li_4Ti_5O_{12}$ electrode is mounted face to face with the graphite electrode separated by a Celgard. The solvent used is PC+EC+TESA (1:1:1 by volume) containing 1 mol of $LiPF_6$+LiTFSI.

In this example, the graphite electrode is used as cathode and the intercalation reaction is an electrolytic reaction of the double layer, of which the anion $PF_6$ is absorbed at the surface of the graphite. The voltage cycling limits are between 1.5 V and 3.0 V, for an average voltage of 2.25 V. This average voltage value increases the energy density by 50% with respect to values obtained with a conventional carbon-carbon system.

The efficiency of the first cycle is 96%. After 200 cycles, no loss of capacity was observed.

Example 9

Preparation of $Li_4Ti_5O_{12}$ Particles Coated with Carbon Using a Polyol as a Carbon Source 87 g of particles of $TiO_2$ with anatase structure coated with polyol (type XP-413 from the Kronos Company in Varennes) are mixed with 35.4 g of $Li_2CO_3$ (Limetech, Canada). The mixture of these two compounds is carried out in the presence of water using Jar milling. The mixture-zircon balls-free volume ratio is 1/3-1/3-1/3. Milling time is 24 h. The paste obtained is dried at 120° C. for 12 hours. Calcination of the powder obtained is carried out in a rotary kiln (fabricated in-house) in two temperature stages. The first stage is at 400° C. for one hour and the second stage at 850° C. for 3 hours in a controlled nitrogen atmosphere. The analysis by X-ray diffraction of the powder synthesized clearly shows that nano-particles of $Li_4Ti_5O_{12}$ with spinel structure are obtained (as established using SEM). The analysis of carbon content carried out by the carbon sulfur detector method (model CS444, Leco, USA) clearly shows that a quantity of 2% by weight remains in the $Li_4Ti_5O_{12}$ structure.

Example 10

Preparation of $Li_4Ti_5O_{12}$ Particles Using Polyethylene Glycol as a Source of Carbon 87 grams of $TiO_2$ with anatase structure (XP-406 from the Kronos Company, Varennes) are mixed with 35.4 g of $Li_2CO_3$ (Limetech, Canada) and with 8 grams of PE-PO. The three compounds are mixed in the presence of water using Jar milling. The mixture-zircon balls-free volume ratios are 1/3-1/3-1/3. The milling time is 24 hours. The paste obtained is dried at 120° C. for 12 hours. Calcination of the powder obtained is carried out in a rotary kiln (fabricated in-house) in two temperature stages. The first is at 400° C. for one hour and the second at 850° C. for 3 hours in a controlled nitrogen atmosphere. Analysis by X-ray diffraction of the synthesized powder clearly shows that a spinel structure with nano-particles of $Li_4Ti_5O_{12}$ is obtained, the size of the particles is established using SEM. Analysis of carbon content obtained is carried out using the carbon sulfur detector method (model CS444, Leco, USA). It clearly shows that 2% by weight of carbon remains present in the $Li_4Ti_5O_{12}$ structure.

Example 11

Preparation of Particles of $Li_4Ti_5O_{12}$ Coated with Carbon by Calcination and Using Coated $TiO_2$ Particles 87 grams of $TiO_2$ particles with anatase structure coated with $Al_2O_3$ (type XP-414 from the Kronos Company, Varennes) are mixed with 35.4 grams of $Li_2CO_3$ (Limetech, Canada) and with 7 grams of Shawinigan black. The three compounds are mixed in the presence of water using Jar milling. The mixture-zircon balls-free volume ratios are 1/3-1/3-1/3. The milling time is 24 hours. The paste obtained is dried at 120° C. for 12 hours. Calcination of the powder obtained is carried out in a rotary oven (fabricated in-house) in two temperature stages. The first stage is at 400° C. for one hour and the second stage is at 850° C. for 3 hours in a controlled nitrogen atmosphere. Analysis by X-ray diffraction of the synthesized powder clearly shows that a spinel structure with nano-particles of $Li_4Ti_5O_{12}$ is obtained, the size of the particles is measured using SEM. Analysis of the carbon content obtained is carried out using the carbon sulfur detector method (model CS444, Leco, USA). It clearly shows that 1.95% by weight of carbon remains present in the $Li_4Ti_5O_{12}$ structure.

Example 12

Preparation of $Li_4Ti_5O_{12}$ Particles from Particles of $TiO_2$ Coated with an $Al_2O_3$-Polyls Mixture 87 grams of $TiO_2$ with anatase structure coated with an $Al_2O_3$-polyols mixture (of XP-415 type from the Kronos Company, Varennes) are mixed with 35.4 g of $Li_2CO_3$ (Limetech, Canada) and with 7 grams of Shawinigan black. The three compounds are mixed in the presence of water using Jar milling. The mixture-zircon balls-free volume ratios are 1/3-1/3-1/3. The milling time is 24 hours. The paste obtained is dried at 120° C. for 12 hours. Calcination of the powder obtained is carried out in a rotary oven (fabricated in-house) in two temperature stages. The first is at 400° C. for one hour and the second at 850° C. for 3 hours in a controlled nitrogen atmosphere. Analysis by X-ray diffraction of the synthesized powder clearly shows that a spinel structure with nano-particles of $Li_4Ti_5O_{12}$ is obtained; the size of the particles is measured using SEM. Analysis of the carbon content obtained is carried out using the carbon sulfur detector method (model CS444, Leco, USA). It clearly shows that 1.95% by weight of carbon remains present in the $Li_4Ti_5O_{12}$ powder.

Example 13

Preparation of a Battery with $Li_4Ti_5O_{12}$ Particles Coated with Carbon and with EC+PC+DMC as Solvent According to the operating method of example 1, $Li_4Ti_5O_{12}$ is mixed with PVDF and Shawinigan black in a weight ratio 87/10/3. This mixture is applied to an aluminium Exmet electrode. All of this is heated for 12 hours with nitrogen scavenging, then for 2 hours in vacuum.

Carbon with a large specific surface area (PICA, FRANCE) is mixed with PVDF in a weight ratio of 20/80. This mixture is applied to an aluminium Exmet type electrode. All of this is heated for 12 hours with nitrogen scavenging then heated for 2 hours in vacuum.

The $Li_4Ti_5O_{12}$ electrode is mounted face to face with a carbon electrode as cathode, separated by a Celgard. The solvent used is EC+PC+DMC (1:1:1 by volume) containing 1 mole of $LiTFSI+LiBF_4$.

In this example, the carbon electrode is used as cathode. The intercalation reaction in this case is a double layer electrolytic reaction, wherein the PF6 and TFSI anions are absorbed at the carbon surface. The cycling voltage limits are between 1.5 V and 3.0 V with an average potential of 2.25 V. This average voltage value increases the energy density by 50% comparatively to the conventional carbon-carbon system.

The efficiency of the first cycle is 96%. After 200 cycles, no capacity loss has been observed.

Example 14

Preparation of a Battery from Particles of $Li_4Ti_5O_{12}$ Coated with Carbon

According to the operating method of example 1, $Li_4Ti_5O_{12}$ is mixed with PVDF and Shawinigan black in a weight ratio 87/10/3. This mixture is applied to an aluminium Exmet electrode. All of this is heated for 12 hours with nitrogen scavenging at a temperature of 120° C., then for 2 hours in vacuum at a temperature of 120° C.

A conductive polymer of the polyaniline type is mixed with PVDF and Shawinigan black in a weight ratio 87:10:3. The mixture thus obtained is applied to an aluminium Exmet electrode, then heated for 12 hours with nitrogen scavenging at a temperature of 120° C., then for 2 hours in vacuum at a temperature of 120° C.

The $Li_4Ti_5O_{12}$ electrode is mounted face to face with the carbon electrode as cathode separated by a Celgard. The solvent used is EC+PC+DMC (1:1:1 by volume), commonly called, containing 1 mole of LiTFSI+LiBF$_4$.

In this example, the polymer electrode conductor is used as cathode. The intercalation reaction is then a doping reaction of the PF$_6$ and TFSI anions across the conductive polymer chains. The cycling voltage limits are comprised between 1.5 V and 3.0 V with an average voltage of 2.25 V. The performance observed is comparable to that obtained in the preceding example.

In conclusion, the particles according to the present invention present a surprisingly notable spreading capacity, an excellent nominal capacity, an excellent cycling stability and a remarkable high current power in electrochemical devices that use them, in particular at the electrode level, as well as flexibility regarding electrode thickness that can be produced using these particles.

Thus at 12 C (5 minutes), the particles in nano form yield 90% of the nominal capacity, while the corresponding macroparticles develop no more than 50% of the capacity. The macros also have a limitation with currents less then 5 C. The nano-particles do not have any limitation.

In addition, if the pretreatment of the initial mixture is not optimized, e.g. if the milling time is less than 15 minutes, the synthesis of the mixture in the presence of carbon gives rise to macroscopic particles.

In addition, diffusion of lithium is faster in the case of nano-particles.

Even though the present invention has been described using specific embodiments, it is understood that many variations and modifications could be made to said embodiments, and the present invention covers all such modifications, usages or adaptations of the present invention that generally follow the principles of the invention and including any variation of the present description which become known or are conventional in the field of activity wherein the present invention is used, and which can apply to the essential elements mentioned above, in agreement with the scope of the following claims.

The invention claimed is:

1. A process for synthesizing, under an atmosphere of air, particles of an oxide corresponding to a formula selected from:
   $Li_4Ti_5O_{12}$;
   $Li_{(4-\alpha)}Z_\alpha Ti_5O_{12}$, wherein $\alpha$ represents a number greater than zero and less than or equal to 0.33, and Z represents at least one metal; and
   $Li_4Z_\beta Ti_{(5-\beta)}O_{12}$, wherein $\beta$ represents a number greater than zero and less than or equal to 0.5, and Z represents at least one metal,
   said particles having carbon coating with a thickness in a range of 10-450 nm,
   said process comprising the steps of:
   a) intimately dispersing ternary mixture of TiOx-LizY-carbon, wherein
      x is a number between 1 and 2,
      z is 1 or 2,
      Y is a radical chosen from the group consisting of CO$_3$, OH, O and TiO$_3$ or a mixture thereof, and
      the carbon is a carbon powder selected from the group consisting of natural or artificial graphite, carbon black, Shawinigan black, Ketjen black and cokes;
   b) heating the dispersion at a temperature of between 400 and 1,000° C.; and
   c) if appropriate, adding a source of at least one metal Z to the ternary mixture,
   wherein the operating conditions are chosen in such a way as to yield a conversion of the initial products respectively into $Li_4Ti_5O_{12}$, $Li_{(4-\alpha)}Z_\alpha Ti_5O_{12}$, $Li_4Z_\beta Ti_{(5-\beta)}O_{12}$.

2. The process of claim 1, wherein the dispersed ternary mixture is heated at a temperature of about 600° C.

3. The process of claim 2, wherein the dispersed ternary mixture is heated in two steps, the first step being carried out until the dispersed ternary mixture reaches a temperature of about 400° C. and the second step being carried out until the dispersed ternary mixture reaches a temperature of about 600° C.

4. The process of claim 3, wherein the first step is carried out by rapid heating to around 400° C.

5. The process of claim 3, wherein the second step is carried out by slow heating.

6. The process of claim 3, wherein at least one step of step a) or step b) is carried out at least in part in inert atmosphere.

7. The process of claim 1, wherein the dispersed ternary mixture is prepared using water and/or at least one solvent.

8. The process of claim 1, wherein the dispersed ternary mixture is prepared without solvent.

9. The process of claim 1, wherein the $Li_zY$ compound comprises at least one compound selected from the group consisting of $Li_2O$, $Li_2CO_3$, and LiOH.

10. The process of claim 9, wherein the $Li_zY$ compound consists of $Li_2CO_3$.

11. The process of claim 1, wherein the dispersed ternary mixture is prepared by high energy mechanical milling.

12. The process of claim 1, wherein TiO$_x$ is of the anatase or rutile TiO$_2$ type, or a mixture of both.

13. The process of claim 1, wherein the compound $Li_zY$ comprises $Li_2TiO_3$.

14. The process of claim 1, wherein the carbon is in the form of particles having a specific surface area greater than or equal to 2 m$^2$/g.

15. The process of claim 12, wherein the TiO$_2$ used as an initial product is coated with at least one inorganic material.

16. The process of claim 12, wherein the TiO$_2$ used is coated with a hybrid inorganic-organic material.

17. The process of claim 1, wherein the size of particles in the ternary mixture is between 100 nanometers and 10 micrometers.

18. The process of claim 1, wherein the concentration of components of the ternary mixture are chosen in such a way as to yield a conversion of the initial products into carbon coated $Li_4Ti_5O_{12}$, $Li_{(4-\alpha)}Z_\alpha Ti_5O_{12}$, $Li_4Z_\beta Ti_{(5-\beta)}O_{12}$.

19. A process for synthesizing, under an atmosphere of air, particles of an oxide corresponding to a formula selected from:
   $Li_4Ti_5O_{12}$;
   $Li_{(4-\alpha)}Z_\alpha Ti_5O_{12}$, wherein $\alpha$ represents a number greater than zero and less than or equal to 0.33, and Z represents at least one metal; and
   $Li_4Z_\beta Ti_{(5-\beta)}O_{12}$, wherein $\beta$ represents a number greater than zero and less than or equal to 0.5, and Z represents at least one metal,
   said process comprising the steps of:
   a) intimately dispersing ternary mixture of TiOx-LizY-carbon, wherein
      x is a number between 1 and 2,
      z is 1 or 2,
      Y is a radical chosen from the group consisting of CO$_3$, OH, O and TiO$_3$ or a mixture thereof, and
      the carbon is a carbon powder selected from the group consisting of natural or artificial graphite, carbon black, Shawinigan black, Ketjen black and cokes;

b) heating the dispersion at a temperature of between 400 and 1,000° C.; and c) if appropriate, adding a source of at least one metal Z to the ternary mixture, wherein the operating conditions are chosen in such a way as to yield a conversion of the initial products respectively into $Li_4Ti_5O_{12}$, $Li_{(4-\alpha)}Z_\alpha Ti_5O_{12}$, $Li_4Z_\beta Ti_{(5-\beta)}O_{12}$, each oxide having carbon coating with a thickness in a range of 10-450 nm.

20. The process of claim 19, wherein the dispersed ternary mixture is heated at a temperature of about 600° C.

21. The process of claim 20, wherein the dispersed ternary mixture is heated in two steps, the first step being carried out until the dispersed ternary mixture reaches a temperature of about 400° C. and the second step being carried out until the dispersed ternary mixture reaches a temperature of about 600° C.

22. The process of claim 21, wherein the first step is carried out by rapid heating to around 400° C.

23. The process of claim 21, wherein the second step is carried out by slow heating.

24. The process of claim 19, wherein the dispersed ternary mixture is prepared using water and/or at least one solvent.

25. The process of claim 19, wherein the $Li_zY$ compound comprises at least one compound selected from the group consisting of $Li_2O$, $Li_2CO_3$, and LiOH.

26. The process of claim 25, wherein the $Li_zY$ compound consists of $Li_2CO_3$.

27. The process of claim 19, wherein the dispersed ternary mixture is prepared by high energy mechanical milling.

28. The process of claim 19, wherein $TiO_x$ is of the anatase or rutile $TiO_2$ type, or a mixture of both.

29. The process of claim 19, wherein the carbon is in the form of particles having a specific surface area greater than or equal to $2\ m^2/g$.

30. The process of claim 19, wherein the size of particles in the ternary mixture is between 100 nanometers and 10 micrometers.

31. The process of claim 19, wherein step b) of heating the dispersion at a temperature of between 400 and 1,000° C., occurs in an atmosphere of air.

32. The process of claim 1, wherein step b) of heating the dispersion at a temperature of between 400 and 1,000° C., occurs in an atmosphere of air.

* * * * *